US006769004B2

(12) United States Patent
Barrett

(10) Patent No.: US 6,769,004 B2
(45) Date of Patent: Jul. 27, 2004

(54) METHOD AND SYSTEM FOR INCREMENTAL STACK SCANNING

(75) Inventor: Kim A. Barrett, Malden, MA (US)

(73) Assignee: iRobot Corporation, Burlington, MA (US)

( * ) Notice: Subject to any disclaimer, the term of this patent is extended or adjusted under 35 U.S.C. 154(b) by 564 days.

(21) Appl. No.: 09/844,358

(22) Filed: Apr. 27, 2001

(65) Prior Publication Data
US 2003/0126352 A1 Jul. 3, 2003

Related U.S. Application Data
(60) Provisional application No. 60/200,142, filed on Apr. 27, 2000.

(51) Int. Cl.[7] .............................................. G06F 17/00
(52) U.S. Cl. ...................... 707/206; 707/205; 711/170
(58) Field of Search ................... 707/1–10, 100–104.1, 707/200–206; 711/170–173

(56) References Cited

U.S. PATENT DOCUMENTS

| | | | |
|---|---|---|---|
| 4,797,810 A | 1/1989 | McEntee et al. | |
| 5,392,432 A | 2/1995 | Engelstad et al. | |
| 5,485,613 A | 1/1996 | Engelstad et al. | |
| 5,560,003 A | 9/1996 | Nilsen et al. | |
| 6,055,612 A | 4/2000 | Spertus et al. | |
| 6,081,665 A | 6/2000 | Nilsen et al. | |
| 6,681,306 B1 * | 1/2004 | Kessler et al. | 707/206 |
| 6,684,392 B2 * | 1/2004 | Eidt | 707/206 |
| 6,691,217 B2 * | 2/2004 | Beukema et al. | 707/205 |

OTHER PUBLICATIONS

Sir–an et al., Do generational schemes improve the garbage collection efficiency, Performance Analysis of Systems and Software, 2000, ISPASS, 2000 IEEE International Symposium on, Apr. 24–25, 2000, pp. 58–63.*

Kordale et al., Distributed/concurrent garbage collection in distributed shared memory systems, Object Orientation in Operating Systems, 1993, Proceedings of the Third International Workshop on, Dec. 9–10, 1993, pp. 51–60.*

Ryu et al., Distributed garbage collection by timeouts and backward inquiry, Computer Software and Applications Conference, 2003, COMPSAC 20003, Proceedings, 27th Annual International, Nov. 3–6, 2003, pp. 426–433.*

G. Steele Jr., Multi–Processing Compactifying Garbage Collection, Communications of the ACM, Sep. 1975, pp. 495–508, vol. 19, No. 6.

G. Steele Jr., Corrigendum: Multi–Processing Compactifying Garbage Collection, Communications of the ACM, Jun. 1976, p. 354, vol. 19, No. 6.

B. Magnusson, R. Henriksson, Garbage Collection for Control Systems, IWMM, 1995, pp. 323–342, Springer–Verlag, Berlin Heidelberg.

T. Le Sergent, B. Berthomiev, Incremental Multi–Threaded Garbage Collection on Virtually Shared Memory Architectures, IWMM, 1992, Springer–Verlag, Berlin Heidelberg pp. 179–199.

S. Nettles, J. O'Toole, D. Pierce, N. Haines, Replication Based Incremental Copying Collection, IWMM, 1992, pp. 357–364, Springer–Verlag, Berlin Heidelberg.

P. Pirinen, Barrier Techniques for Incremental Tracing, ISMM, 1988, pp. 20–25, ACM Press, NY, NY.

(List continued on next page.)

Primary Examiner—David Jung
(74) Attorney, Agent, or Firm—Testa, Hurwitz & Thibeault, LLP

(57) ABSTRACT

An incremental garbage collector and method of incremental garbage collection useful for systems with real-time requirements, including a method for incrementally scanning multiple program stacks in units of individual stack locations. Methods and system allow the garbage collector to be preempted by the system and then return to garbage collection without rescanning any portion of a partially completed stack.

5 Claims, 6 Drawing Sheets

OTHER PUBLICATIONS

P. Pardyak, B. Bershad, A Memory–Efficient Real–Time Non–Copying Garbage Collector, ISMM, 1998, pp. 118–129, ACM Press, NY, NY.

P. Cheng, R. Harper, P. Lee, Generational Stack Collection and Profile Driven Pretenuring, PLDI, 1998, pp. 162–173, ACM Press, NY, NY.

S. Nettles, J. O'Toole, Real–Time Replication Garbage Collection, PLDI, 1993, pp. 217–226, ACM Press, NY, NY.

P. Wilson, M. Johnstone, Real–Time Non–Copying Garbage Collection, ACM OOPSLA, 1993, pp. 1–8.

P. T. Withington, How Real is "Real–Time" GC?, OOPLSA, 1991, pp. 1–8.

P. Wilson, Uniprocessor Garbage Collection Techniques, IWMM, 1992, pp. 1–34, Springer–Verlag, Berlin Heidelberg.

T. Yuasa, Real Time Garbage Collection on General Purpose Machines, Journal of Software Systems, Feb. 1986, pp. 1–37.

P. Wilson, Uniprocessor Garbage Collection Techniques, ACM Computing Surveys, pp. 1–67.

R. Jones, R. Lins, Garbage Collections Algorithms for Automatic Dynamic Memory Management, 1996, pp. 218–226, John Wiley & Sons Ltd, West Sussex, England.

R. Brooks, C. Rosenberg, L–A Common LISP for Embedded Systems, Assoc. of LISP Users meeting + Workshop Proceedings, 1995, Assoc. of LISP Users, Malvern, PA.

M.S. Johnstone, Non–Compacting Memory Allocation and Real–Time Garbage Collection, PhD Thesis, U. of Texas, Dec. 1997.

* cited by examiner

```
;;;;;;;;;;;;;;;;;;;;;;;;;;;;;;;;;;;;;;;;;;;;;;;;;;;;;;;;;;;;;;;;;;;;;;;;;;;;;;;
;;; Stack scan unwind routines for incremental collector
;;;
;;;    :UNWIND-MULTI-STACK
;;;    :UNWIND-MASTER-STACK
;;;
;;; There is an unwind routine for each stack type (multi and master).
;;; The multi vs master distinction indicates the location of the associated
;;; scan pointer: in the stack header for multi-stacks, and in the
;;; multi-master area for the master stack. When the incremental stack scanner begins scanning a
;;; new call frame, it first determines the location of the saved state for this new frame.
;;; Except for the last frame of a stack, that saved state is in the next
;;; call frame. For the last frame, the saved state is in the stack header
;;; (multi-stacks) or the multi-master area (master stack). Note that the
;;; handling of the last frame of the current stack is special, and handled
;;; somewhat differently. Once the location of the saved state is determined, the return address
;;; from that saved state is recorded in a sysquant global and that return
;;; address is replaced with the entry point for the appropriate unwind
;;; routine. Once the saved state of the previous frame (which is in the current
;;; frame) has been scanned, the return address in that saved state for the
;;; previous frame (which must be the unwind routine, except in the case of
;;; the initial frame, when its value is unspecified) is restored.

(garbage-collector-dispatch
  (:stop-and-copy `(progn))
  (:treadmill
   (macrolet
    (((define-unwind (name stack-type)
        `(lapform ,name :procedure ()
           #U "L-COMPILER-68K"
           ((increment-gc-statistic #,name)
            (lea (frame ,(ltarget *lframe-bottom*)) utemp)
            (if# (eq #,stack-type :master)
              (move (multi-ref :master-scan-pointer) a0)
              (store-untraced utemp (multi-ref :master-scan-pointer)))
             elseif# (eq #,stack-type :multi)
              (move (multi-ref :current-hwprocess) a1)
              (move (%stack-ref a1 ,*stack-scan-pointer*) a0)
              (store-untraced utemp (%stack-ref a1 ,*stack-scan-pointer*))
             else#
              (error# "Unknown stack type: ~S." #,stack-type))

(scan-stack-block a0 sp
                              :context :unwind
                              :atemp utemp
                              :dtemp0 d2
                              :dtemp1 dtemp)
            (move cp d2)
            (mark-possible-pointer d2 :unwind
                                   :base nil
                                   :atemp utemp
                                   :dtemp0 d2
                                   :dtemp1 dtemp)

(move (sq-ref ,(ltarget *lsq-gc-incremental-saved-pc*)) utemp)
            (jmp (areg-indirect utemp)))))))

(define-unwind :UNWIND-MULTI-STACK  :multi)
     (define-unwind :UNWIND-MASTER-STACK :master)
     )))
```

FIG. 5

METHOD AND SYSTEM FOR INCREMENTAL STACK SCANNING

CITATION OF PROVISIONAL APPLICATION

This application for U.S. patent is a non-provisional conversion of U.S. provisional application for patent Serial No. 60/200,142 filed Apr. 27, 2000.

STATEMENT REGARDING FEDERALLY SPONSORED RESEARCH AND DEVELOPMENT

This research was sponsored by the Defense Advanced Research Projects Agency (DARPA). Technical and contracting management were provided by USAF Rome Laboratory under Contract F30602-96-C-0280.

FIELD OF THE INVENTION

This invention relates to a method for automatic memory management known as "garbage collection." More specifically, this invention relates to improvements in incremental garbage collection most useful for object-oriented program-controlled systems with real-time constraints.

BACKGROUND OF THE INVENTION

Briefly, garbage collection, the automatic recycling of dynamically allocated memory, is a tried and tested memory management technique that has been in use since its invention by John McCarthy in 1958 as part of the implementation of Lisp. Garbage collection avoids the need for the programmer to deallocate memory blocks explicitly, thus avoiding a number of problems, including memory leaks, double frees, and premature frees. The burden on the programmer is reduced by not having to investigate such problems, thereby increasing productivity, and dramatically simplifying programs by allowing modules to present cleaner interfaces to each other. The use of garbage collectors in automatic memory management is well known in the prior art, and detailed descriptions of the art appear in U.S. Pat. No. 6,055,612 and other sources cited in this disclosure, and incorporated by reference herein. The reader is assumed to be one of skill in the art and familiar with the terms common to the art.

Nevertheless, many garbage collectors stop all other activity in the system for a significant, unpredictable duration of time while the garbage collector is running, which makes these systems unsuitable for systems with real-time constraints. In response to such limitations in standard garbage collectors, a number of incremental garbage collectors have been proposed and developed which avoid the stop-and-collect procedure of traditional garbage collectors. However, the incremental garbage collectors developed to date have not fully met the needs of a hard real-time system.

Many existing incremental garbage collectors require some unpredictable and possibly large atomic operation either at the start of a collection cycle or as part of the completion of the mark phase. For example, the garbage collector described in Taiichi Yuasa, "Real-Time Garbage Collection on General Purpose Machines," *Journal of Software & Systems,* 11(3):181–198 (1990), copies the entire program stack at the start of a collection cycle, and incrementally scans that copy. The garbage collector disclosed in Mark Stuart Johnstone, "Non-Compacting Memory Allocation and Real-Time Garbage Collection," Ph.D. thesis, U. of Tex. at Austin (December 1997), treats all stacks as part of the root set to be scanned in an atomic operation at the start of each collection cycle. While these solutions lead to some efficiency gains, both suffer from an unpredictable and possibly large startup pause.

Likewise, the garbage collector disclosed in Tian F. Lim et al., "A Memory-Efficient Real-Time Non-Copying Garbage Collector," *Conference Proceedings of the International Symposium on Memory Management,* Vancouver, Canada (October 1998), scans stacks at the end of a collection cycle, scanning all stacks and then reinitiating the mark phase for objects shaded grey during the stack scan. (For purposes of additional clarity in this disclosure, the tri-color marking scheme is used in which during the mark phase of the collector, objects are partitioned into three sets. Black objects have been noted as reachable and have had their contained references scanned. Grey objects have also been noted as reachable but their contents have not yet been scanned. White objects have not yet been noted as reachable and might be reclaimed. To mark an object, the method of system examines its color, and if it is white, transfers it to the grey set. Grey objects are transferred to the black set when they are scanned.) Lim et al. make this process incremental by limiting the amount of stack scanning that will be performed and rescanning those stacks that were reactivated after a preempted increment of stack scanning. This solution presents two limitations: first, the granularity of this operation is relatively coarse, and second, a high rate of stack reactivation could significantly delay the completion of this process, possibly indefinitely.

Finally, Thierry Le Sargent & Bernard Barthomieu, "Incremental Multi- Threaded Garbage Collection on Virtually Shared Memory Architectures," in *Proceedings of International Workshop on Memory Management,* St. Malo, France (September 1992), propose the use of virtual memory support to perform incremental stack scanning. In their proposed collector, the top page of each stack is treated as part of the root set and scanned at the start of the collection cycle, while other pages of the stack are made inaccessible. An attempt to access an inaccessible stack page is trapped by the virtual memory system, and the page is scanned at that time. The incremental scanner then scans stack pages that have not otherwise been scanned. This approach requires that essentially arbitrary chunks of the stack (or individual pages) can be scanned with little or no information available about their content, which imposes possibly significant restrictions on what the mutator can store on the stack and in what format.

Therefore, while many incremental garbage collectors—including those discussed above—are described as real-time, for the reasons discussed their performance cannot meet the needs of certain real-time applications. For these systems, results must be on time, and a late result is as useless as an incorrectly calculated one. Therefore, there remains the need for an improved garbage collector able to satisfactorily meet the needs of a system requiring real-time operation.

SUMMARY OF THE INVENTION

The object of the invention is attained by modifying an incremental garbage collector so that the stack scan can be performed incrementally in units of individual stack locations without having to rescan any stack when the garbage collector is preempted by the system to perform real-time operations.

In the present invention, the stack is scanned by dividing it into call frames, and by using continuation replacement to notify the collector that the mutator has modified a frame being processed by the collector. In one embodiment, a stack is scanned in push order, from the base of the stack toward the top of the stack.

In the preferred embodiment, when starting the scan of a call frame, the continuation for reactivating that call frame is replaced with an unwind routine which is used to detect reactivation of that frame. The scan of the stack is made incremental by recording at each step the call frame being processed and the progress made so far in processing it. This allows the stack scanner to perform some small increment of work and then return, resuming where it left off when next invoked. An increment of work in this process can be as little as scanning one stack location.

It is a further object of the preferred embodiment of the present invention that when the stack scanner reaches the last call frame for a stack, there are two cases to be considered. If the stack being scanned is not the current stack, then proceed as for any other call frame. Otherwise, when the stack being scanned is the current stack, the call frame should be treated as if it were partially scanned and then reactivated; that is, it should be processed in the same manner as would be done by the unwind routine.

It is also an object of the invention to integrate the incremental scan of the stacks into the mark phase of a collector.

Finally, although the method and system described herein were developed as part of a treadmill collector, it does not rely on details of that collector. This method can be applied to, for example, a Mark and Sweep collector, an indirection-based collector, or a replicating collector known to one of skill in the art.

BRIEF DESCRIPTION OF THE DRAWING

FIG. 5 contains exemplary code for implementing the unwind routine.

BRIEF DESCRIPTION OF THE APPENDIX

In addition, the exemplary code for implementing the preferred embodiment of the present invention is attached in Appendix A. Page and line numbers have been added to the code for reference purposes and are referred to within this disclosure.

DETAILED DESCRIPTION OF A PREFERRED EMBODIMENT

For purposes of providing a detailed description of a preferred embodiment, this discussion focuses on an implementation of the present invention as an improvement on a prior art treadmill collector for use with an implementation of L, a Common Lisp dialect designed for embedded real-time robot control systems. One of skill in the art will recognize that the invention is not limited to just this particular type of garbage collector or programming language. Additional details on the treadmill collector of the preferred embodiment can be found in Henry Baker, *The Treadmill, Real-Time Garbage Collection Without Motion Sickness*, ACM SIGPLAN Notices, 27(3), March 1992. Additional details on the specific implementation of L can be found in Rodney A. Brooks & Charles Rosenberg, *L—A Common Lisp for Embedded Systems*, Association of Lisp Users Meeting and Workshop LUV '95, August 1995.

The treadmill collector used in the preferred embodiment is broadly similar to those described in: (a) Paul R. Wilson & Mark S. Johnstone, *Truly Real-Time Non-Copying Garbage Collection*, which is discussed in Elliot Moss, Paul R. Wilson & Benjamin Zorn, editors. OOPSLA/ECOOP '93 Workshop on Garbage Collection in Object-Oriented Systems, October 1993; (b) Mark Stuart Johnstone, *Non-Compacting Memory Allocation and Real-Time Garbage Collection* Ph.D. thesis, University of Texas at Austin, December 1997; and (c) Tian F. Lim, Przemyslaw Pardyak, and Brian N. Bershad, *A Memory-Efficient Real- Time Non-Copying Garbage Collector*, Conference Proceedings of the International Symposium on Memory Management, Vancouver, Canada, October 1998 (ACM Press) pp. 118–129. While these references are not necessary for the understanding of the present invention, each is hereby incorporated by reference herein.

The treadmill of the preferred embodiment uses a segregated storage strategy, having multiple treadmills for different sizes of objects. It uses tri-color marking with a write barrier to maintain coherence between the collector and the mutator. While various embodiments of the present invention can be configured to use various write barriers, including either an incremental update or a snapshot at the beginning write barrier, the preferred embodiment uses a snapshot at the beginning write barrier and is discussed in detail below.

Figure 1:
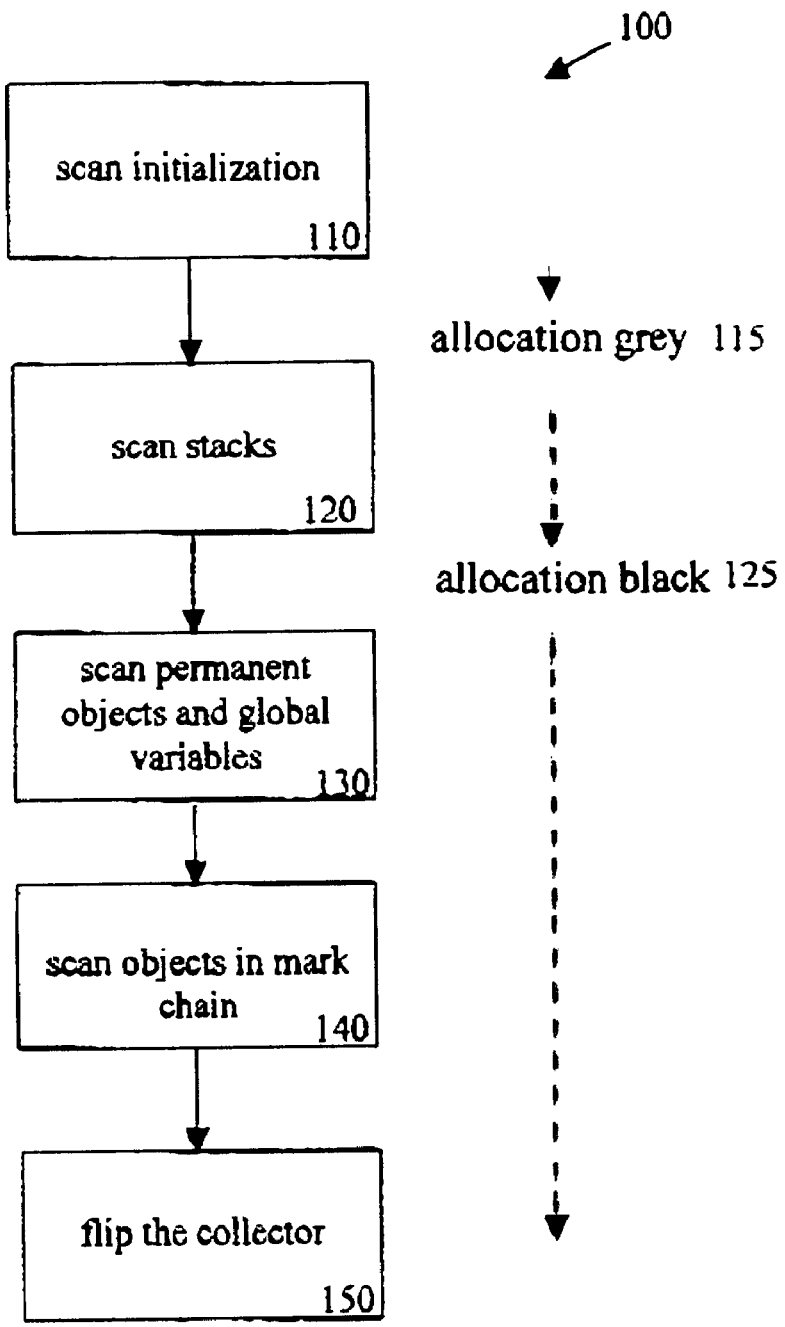
FIG. 1 is a flow diagram depicting an overview of the incremental garbage collector.

As depicted in FIG. 1, the incremental collector of the present invention proceeds in stages (steps 110–150), with each stage being incremental. Certain stages are performed exactly once per collection cycle, while others might be transitioned back to by a later stage.

In the preferred embodiment, the current stage is encoded in the value of a variable containing a pointer to the routine for performing whatever processing is to be done during the current stage. This routine is called with one argument, which is a step request count. The step request count is the number of work units the current incremental step is to perform before allowing the caller to resume. In a preferred embodiment, the amount of work units to perform is based on the system's allocation needs and therefore maintains an appropriate level of garbage collection with each allocation. Each stage has some auxiliary variables used to maintain state from one invocation of the stepper routine to the next, as necessary to record the incremental progress of that stage of the collector. This allows the method and system of the present invention to resume the collection without duplicating effort.

As shown in FIG. 1, the stages are: (1) scan initialization 110, (2) scan stacks 120, (3) scan permanent objects and global variables 130, (4) scan objects in the mark chain until mark chain is empty 140, and (5) flip the collector 150 ("garbage reclamation"), preparing for the next collection cycle. In the specific implementation attached in Appendix A, the scan of permanent objects and global variables occurs in sub-stages: scanning the sysquant area, scanning the permanent scanned cons cells and scanning the permanent scanned headered objects. Each stage will be discussed sequentially in the order it appears in the preferred embodiment. Because the improvements in the garbage collector are within the stack scan 120, only a brief description of the other stages, along with exemplary code, is provided as needed to practice the preferred embodiment of the invention.

As an initial matter, in the implementation disclosed in Appendix A, the transition from one incremental step routine to the next is table driven, so that any individual step routine need not be aware of the routine or routines to which it can transition. (Appendix A, from page 1, line 18 to page 2, line 56, includes exemplary code used in the preferred embodiment for controlling the transitions between the various stages.) The particular order in which the stages are called may depend on the particulars of the implementation of the present invention, including the choice of write barriers, discussed below. In other embodiments, the stages can be coded directly (as opposed to table driven) for the sake of additional efficiency.

Stage 1—Scan Initialization

The scan initialization 110 is performed at system startup and at the end of each collection cycle in preparation for starting the next cycle. The initialization stage ensures that while stack scanning in Stage 2 (step 120) is in progress, all new allocations are colored grey (115). Once the stack scan (step 120) is complete, all new allocations are set to black (125).

Stage 2—Stack Scan

The stack scan is herein first discussed with reference to the incremental stack scan algorithm itself, then discussed with reference to particulars of the preferred embodiment. The stack scan 120 of the preferred embodiment is presented in more detail in the flow diagrams in FIGS. 2, 3A, 3B and 4.

In the present invention, a stack is scanned by dividing it into call frames and by using continuation replacement to notify the collector that the mutator has modified a frame being processed by the collector. A stack is scanned in push order, from the base of the stack toward the top of the stack. While scanning a stack in the other direction, from the top toward the base, is possible, doing so is more complex and may result in significant wasted effort if the mutator happens to frequently reactivate call frames as the collector is processing them.

The stack scanner of the preferred embodiment must be able to parse the stack into call frames. In particular, the scanner must be able to determine the boundaries of call frames, the locations within each call frame that must be scanned, and the location of the continuation that will be invoked to reactivate the call frame.

When starting the scan of a call frame, the continuation for reactivating that call frame is saved, then replaced with an unwind routine, as described below, which is used to detect reactivation of that frame. The scan of the stack is made incremental by recording at each step the call frame being processed and the progress made so far in processing it. This allows the stack scanner to perform some small increment of work and then return, resuming where it left off when next invoked. Importantly, an increment of work in this process could be as little as scanning one stack location.

Figure 2:
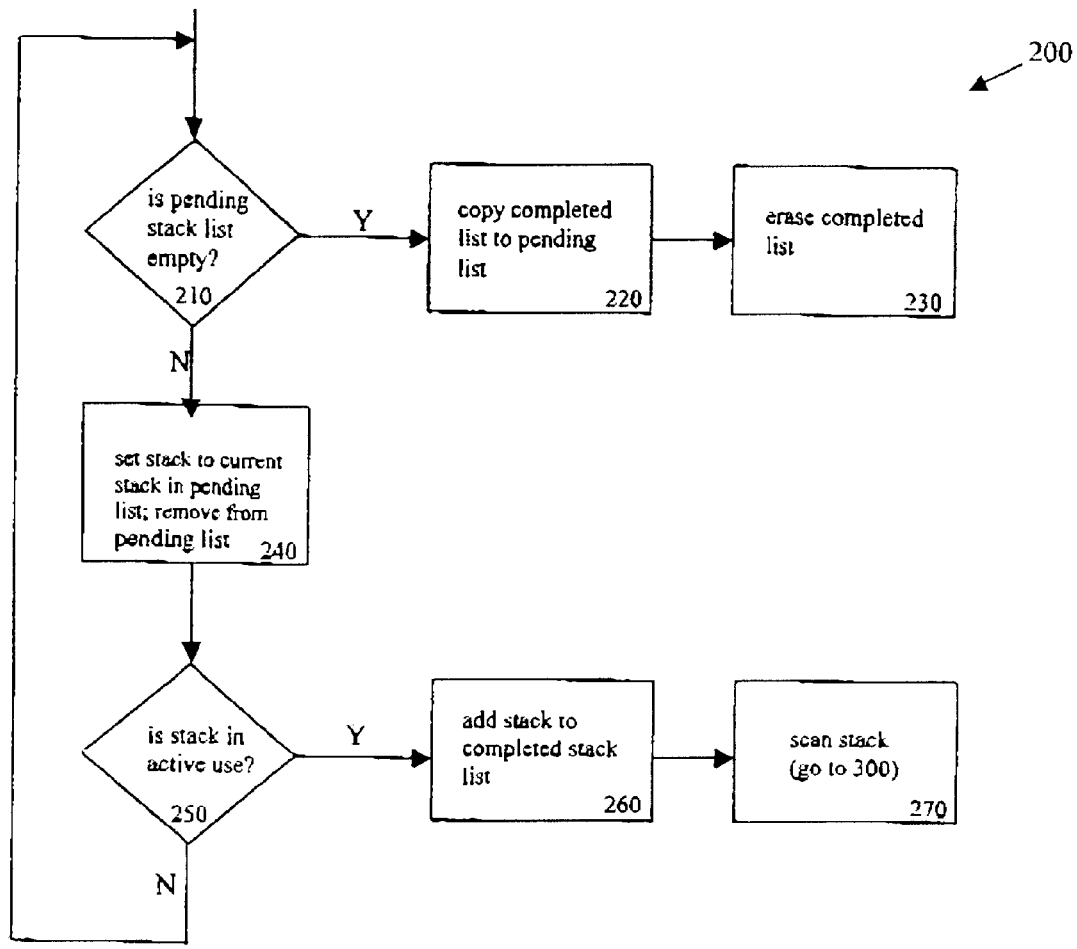
FIG. 2 is a flow diagram of the outer-loop of the preferred embodiment of the present invention.

FIG. 2 depicts an outer-loop 200 for the preferred embodiment of the incremental stack scan. The purpose of the outer-loop is to cycle through each stack, and if the stack is live, scan the stack. Therefore, the system keeps track of whether the stacks have been completed (in a completed stack list) or remain pending (in a pending stack list). Stacks created during a cycle are placed on the completed list. The first step 210 of the preferred method looks to whether the pending stack list is empty. If the pending stack list is empty, then the list of completed stacks is copied to the pending stack list (step 220) and the completed stack list is erased (step 230) in preparation for the next cycle. The garbage collector can then proceed to Stage 3 (step 130).

If the pending stack list is not empty (step 210), a stack is selected to scan (step 240), and the stack is removed from the pending stack list (step 240). The system then determines whether the selected stack has any contents, i.e. whether that particular stack is in active use (step 250). If the stack does not have any contents, the system goes back to the pending stack list (step 210) to look for any remaining stacks for scanning. If the stack has contents, the stack is added to the completed stack list (step 260) and the stack is scanned (step 270). Once a stack has been completely scanned, the stack scanner can proceed on to the next stack, until all stacks have been processed. The process of scanning the selected stack is detailed in an inner- loop, shown in FIGS. 3A and 3B. Appendix A, from page 7, line 33 to page 8, line 36, includes exemplary code for implementing the outer-loop of the preferred embodiment.

Figure 3A:
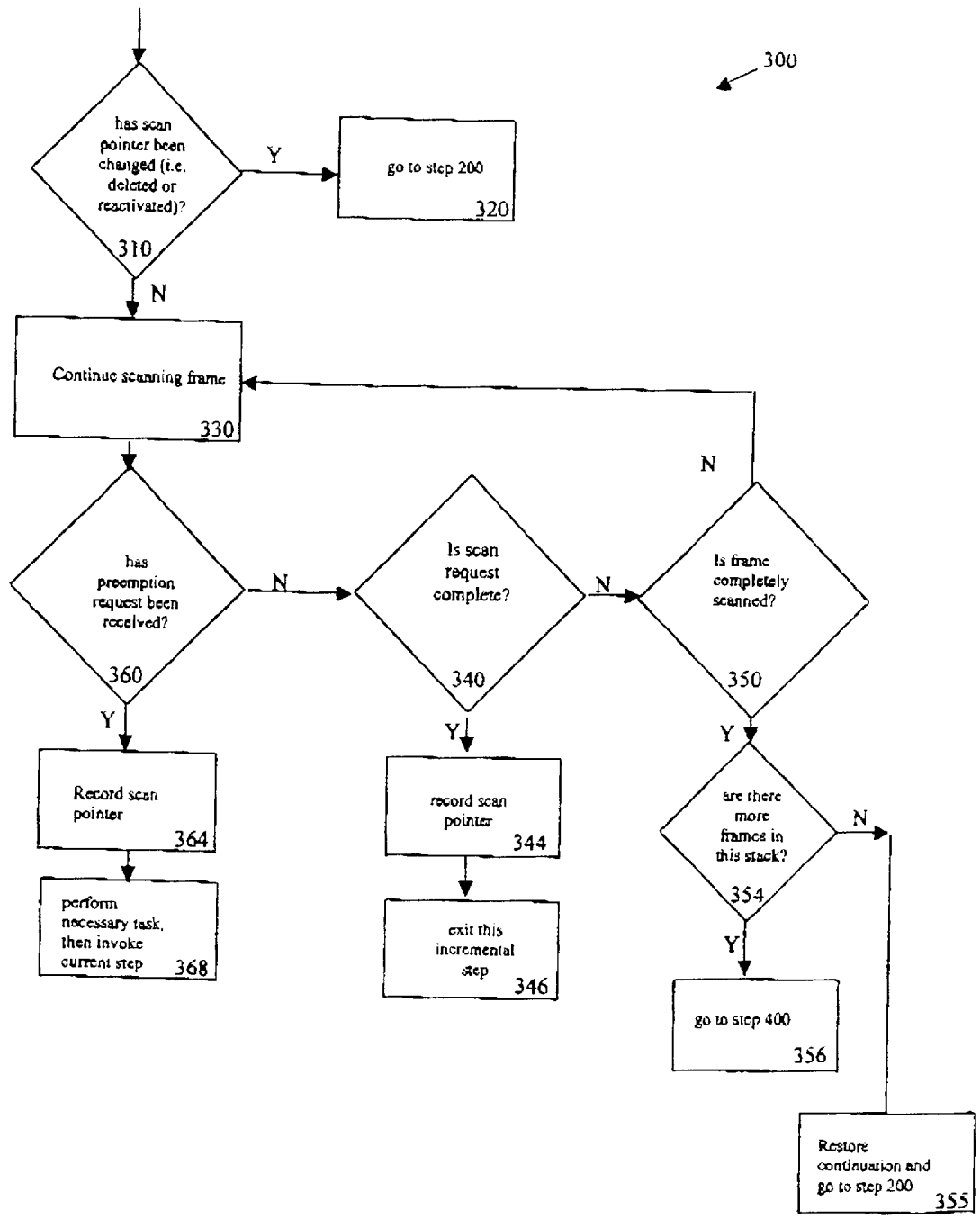
FIGS. 3A and 3B are flow diagrams of the inner-loop of the preferred embodiment of the present invention.
Figure 3B:
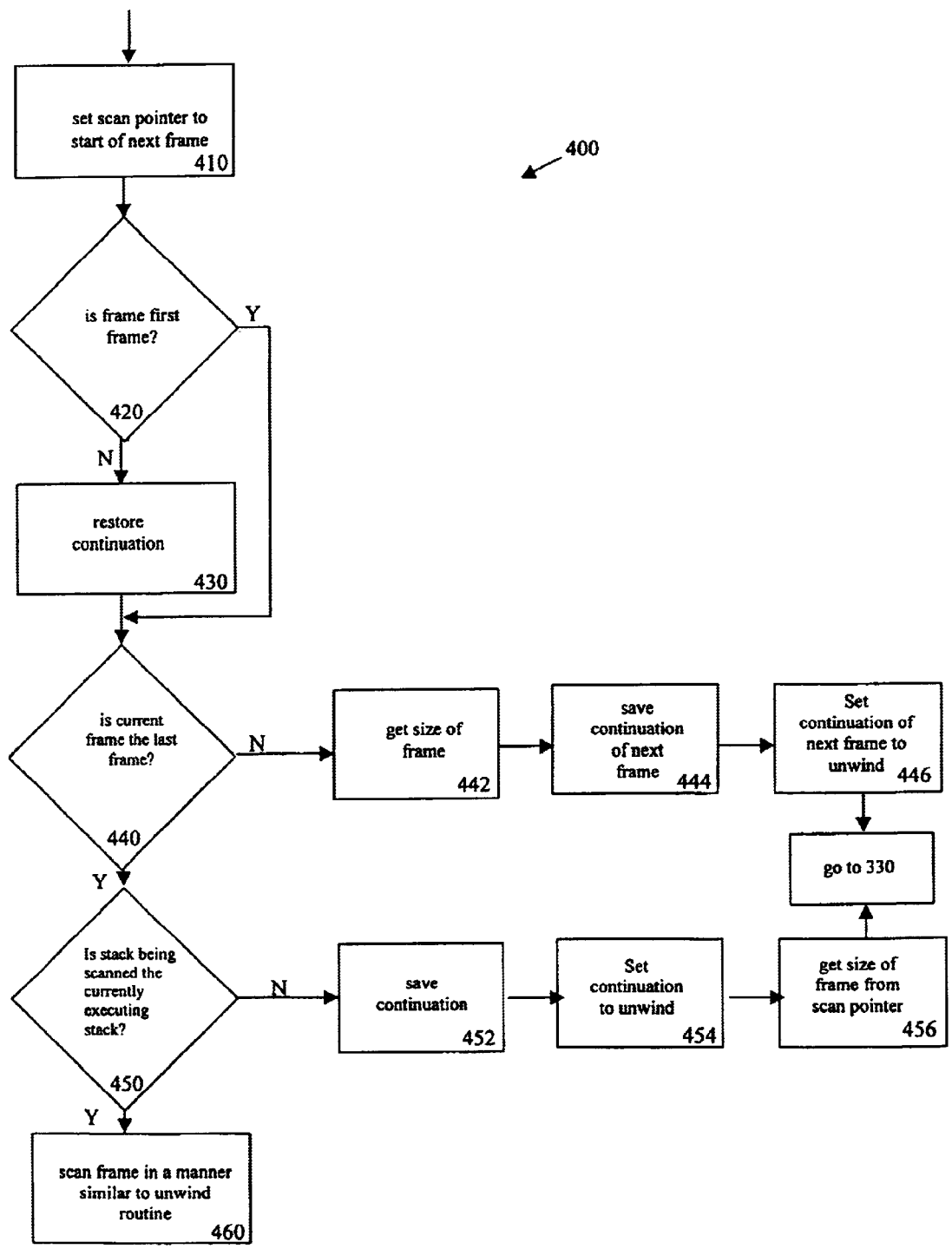

The inner-loop 300 of the stack scan is shown in FIGS. 3A and 3B. The first step (step 310) looks to see if the scan pointer for the particular stack selected for scanning in step 240 has been changed. A change in the scan pointer could represent either that the stack was deleted or that the frame being scanned had been reactivated. If the frame had been reactivated, the scan of that stack would have already been completed. If the stack is no longer in use, the deletion operation alters the stack pointer so that the collector will avoid an unnecessary scan. In either case, the scan pointer has been changed and the system in step 320 returns to the outer-loop 200 to select another stack, if any, for processing.

If it is determined that the scan point has not been changed (step 310), the system will continue to scan the current frame (step 330) until one of three events occur: (a) the scan request is complete (step 340), (b) the frame is completely scanned (step 350), or (c) the system receives a preemption request (step 360). The results from each of these events is discussed below.

Once the scan request is complete (step 340), by having completed the work request by the incremental scan request (i.e. the step request count, as discussed above), the scan pointer representing the progress for the particular scan is recorded (step 344) and the stage 120 is exited (step 346) sending the system to exit this incremental step of the garbage collector.

If a preemption request is received (step 360), the system is being called away from its current garbage collection activity to perform a specific task. The ability of the system to accept a preemption request (step 360) allows this incremental stack scanner to perform garbage collection in systems requiring real-time operations. When a preemption request has been received (step 360), the current scan pointer is recorded (step 364) and the system is released to perform the requested task. When the task is complete, the system will invoke the current incremental step routine, which may have changed during the preemption, with the request residue—the remainder of the request at the point of preemption.

The last condition of the cessation of the scanning of the frame (step 330) is if the frame has been completely scanned (step 350). If the frame has been completely scanned, the system must then determine whether there are additional frames in the current stack (step 354). If there are no additional frames in the current stack, the continuation which was previously stored is restored (step 355) and the system returns to the outer-loop 200 to select another stack, if any, for processing.

FIG. 3B contains a detailed flow diagram 400 of the method of the preferred embodiment where the system in step 354 determines that there are additional frames in the current stack. When there are additional frames in the current stack, the system first sets the scan pointer to the start of the next frame (step 410), where the next frame is the frame pushed immediately after the current frame. That next frame becomes the current frame. Unless the frame is the first frame (special case for start of scan), the continuation that was previously saved is restored (step 430). The first frame has no continuation.

The system then determines if the current frame is the last frame (step 440) and/or whether the stack being scanned is the currently executing stack (step 450). There are three possibilities for the current frame: (a) the current frame is not the last frame (steps 442, 444 & 446), (b) the current frame is the last frame but not the currently executing stack (steps 452, 454 & 456), or (c) the current frame is the last frame of the currently executing stack (step 460). The steps necessary for handling each of these cases are discussed below.

If the current frame is not the last frame, the system gets the size of the frame (step 442), saves the continuation of the next frame (step 444), then sets the continuation of the next frame to the unwind routine (step 446). In the preferred embodiment, the size of the frame is obtained from the header created when the frame is initialized. The system, in this case, then loops back to continue scanning the frame (step 330).

When the stack scanner reaches the last call frame for a stack, there are two cases to be considered. If the stack being scanned is not the currently executing stack, then proceed as for any other call frame, except that the continuation to save is found in the stack header, along with the stack pointer which is used to determine the size of the frame—there is no next frame in this case. Otherwise, when the stack being scanned is the currently executing stack, the call frame should be treated as if it were partially scanned and then reactivated. That is, it should be processed in the same manner as would be done by the unwind routine.

With reference to FIG. 3B, if the current frame is the last frame but not the currently executing stack, the system records the continuation found in the stack header (step 452), sets the continuation to the unwind routine (step 454), gets the size of the frame from the stack pointer (step 456), which was saved in the stack header, and then loops back to continue scanning the frame (step 330).

If the current frame is the last frame of the currently executing stack, the step 460 implemented in the system or method can take one of the following paths. As an optimization incorporated into the preferred embodiment, the system simply ignores this frame because it is known that there are no values in the frame of interest to the collector and nothing need be marked. In that case, the scan pointer need not be modified and system returns to the outer-loop 200 to select another stack, if any, for processing. In the alternative, if the system requires scanning of the final frame, it is treated in the same manner as the unwind routine.

The unwind routine which replaces a call frame's continuation serves multiple purposes. By completing the scan of the frame being reentered, the unwind routine ensures that the stack has passed through the completely scanned state. The unwind routine, by changing the scan pointer informs the stack scanner (step 310) that the scan of the frame has been completed. The unwind routine then resumes execution in the reentered frame by invoking the saved continuation it replaced. Non-local exits must perform similar processing if the resumption point is within a call frame that the scanner has at least started to process.

Figure 4:
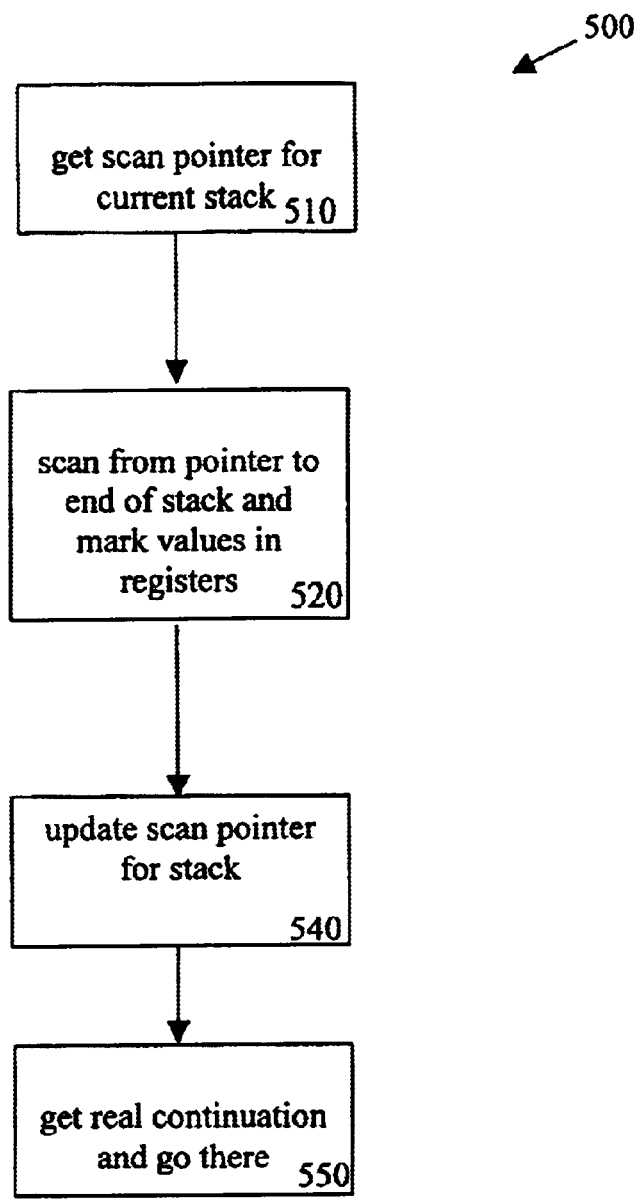
FIG. 4 is a flow diagram of the unwind routine used in the preferred embodiment of the present invention.

FIG. 4 shows a flow diagram of the preferred embodiment of the unwind routine 500. The unwinding routine 500 is executed in the context of the call frame being continued (returned to), which has become the current call frame. Therefore, first, the unwind routine gets the scan pointer for the current stack (step 510). The unwinding routine 500 then scans any unscanned portion of the current call frame and marks any values returned to the current call frame (step 520). In the preferred embodiment, this completes the scanning of the current stack. Subsequent to the completion of the scan (step 520), the unwind routine updates the scan pointer for the stack to indicate that the frame has been activated (step 540). This will trip the condition in the inner-loop (step 310) to inform the system that the scan of the stack had been completed. Finally, the unwind routine 500 recovers the real continuation for the current call frame and goes to that location (step 550). Exemplary code implementing the unwind routine is shown in FIG. 5.

The process of completing the scan (step 520) of the reentered call frame involves marking values in the unscanned part of the stack and marking any related state, such as machine registers and values returned to the reentered frame by the callee. Performing this scan could make the mutator latency introduced by the unwind routine fairly large, particularly if the scan is performed in place. However, this mutator latency can be substantially reduced by instead copying all of the values to be marked to a separate scan buffer, for later processing by the stack scanner.

The mutator latency introduced by this scan completion (step 520) is bounded by the maximum call frame size for the application. In other embodiments, a compiler could report call frame sizes greater than some threshold, or could automatically split functions that exceeded that threshold, in order to keep this latency within some application-specific limit.

In still other embodiments, it is also possible to elide the scan of the reentered call frame entirely, with the idea being to leave the completion of the scan to the normal operation of the stack scanner or to defer it to some other call frame earlier in the stack. However, care must be taken to ensure that doing so does not prevent the stack scanner from making forward progress and reaching eventual termination. Such a failure can occur if the collector repeatedly begins the scan of a frame, only to have that frame reactivated by the mutator. This approach is probably only appropriate when performing short duration, high priority tasks that have tight real-time performance requirements. To use this technique, the mutator must be guaranteed to exit such a deferred scan completion context before too much allocation is performed.

Irrespective of the techniques selected for optimizing the scan completion of the frame, in the preferred embodiment, the scan (step 520) itself can be preempted by recording its state and installing an appropriate unwind routine for use upon reactivation of the frame.

As described above, the incremental scan of the stacks is integrated into the mark phase of the collector. How this should be done depends on the choice of write barrier used by the mutator. The choice of write barrier (which in the preferred embodiment is a snapshot at the beginning write barrier), in combination with incremental stack scanning, leads to interactions with the compiler and runtime model for the system. In order to minimize the performance impact of incremental stack scanning on the mutator while ensuring correct behavior of the collector, the compiler must selectively insert barrier operations when generating memory accesses.

For the purposes of this disclosure, the mutator memory access is divided into the following categories with the associated interactions: first, when reading from or writing into the current call frame, no additional action is needed; second, when reading from a stack location not in the current stack, the value read should be marked; third, when writing to a stack location not in the current call frame, the value written should be marked; fourth, when performing an object initialization write, the value written should be marked when using an incremental write barrier; fifth, when writing into a scanned location, the specified write barrier should be applied; and finally, for all other memory accesses, no additional action is needed. The key point is the collector imposes no additional overhead on the mutator's access to the current call frame.

The fundamental problem for combining a snapshot at the beginning write barrier with incremental stack scanning is that the implicit elimination of references by stack unwinding can lead to violations of the weak tri-color invariant that the write barrier is attempting to maintain. In the present invention, when the scan of a stack completes, all objects directly referenced by the stack have been marked. Further, any additional objects to which the stack later gains reference must either be non-white or be accessible from some not yet scanned location, and in the latter case the write barrier will ensure that the object will eventually be marked. Thus, once a stack has been completely scanned, no further processing of the stack is needed during the current collection cycle.

For example, consider the possible sources of values on a stack after it has been scanned. First, if an object was already present on the stack when the scan started, then it has been marked by the process of scanning the stack. In fact, during the incremental scan of a stack, the scanned part of the stack is protected from becoming the sole reference to a white object by the barrier for storing into a stack location not in the current call frame. Second, if an object is read from some other stack, the barrier for reading from a stack location not in the current call frame will have ensured that it was marked when read. Third, if an object is newly created, it will have been allocated grey or black. Fourth, if an object was written from some other stack, the barrier for storing into a stack location not in the current call frame will have ensured that it was marked when written. Fifth, and finally, if an object was read from some scanned location not previously mentioned, the scanner and the write barrier conspire to ensure that it will be marked.

As a result, in the preferred embodiment when using a snapshot at the beginning write barrier, the mark phase should proceeds as follows:

Mark Phase
   Ensure Allocation Color is Grey
   Scan Stacks
   Ensure Allocation Color is Black
   Scan Roots
   Scan Grey
end Mark Phase As shown in FIG. 4, the unwind routine must complete the partial scan of the call frame being reentered. It then records the stack as completely scanned, recovers the real continuation, and invokes it. As the stack scanner completes the scan of a call frame, it recovers the continuation for the just completed frame and reinstalls the continuation (step 550) over the unwind routine before saving the continuation for the next frame and replacing that next continuation with the unwind routine.

One final consideration is necessary in implementing the incremental stack scanner of the present invention. Incremental stack scanning leads to a requirement that whenever a value is read from or written to a stack location outside the current call frame, the value read or written must be marked. This leads to two problematic situations when allocating on the stack an object having fields that can contain collectable objects.

1. Suppose stack $S_1$ contains a stack allocated object O, O has not yet been scanned, and O contains the sole reference to a heap allocated object W. Now suppose stack $S_2$, which has been scanned, is active, and the mutator reads W from O into the mutator's current call frame. If the reference to W from O is then deleted before the scan of $S_1$ reaches O, by unwinding $S_1$ sufficiently to deallocate O, then W is now live because it is referenced from $S_2$, but might not get marked because $S_2$ has already been scanned.

2. When using a snapshot at the beginning write barrier, suppose stack S contains a stack allocated object O, and the scan of S has passed through O. Further, suppose that the unscanned part of S contains the sole reference to a heap allocated object W. Now suppose that the original reference to W is in the mutator's current call frame, and that the mutator writes W into O. If the original reference to W is eliminated (either by an unwind of S or by overwriting the reference by the mutator while it is in the mutator's current call frame), then W is now live because it is referenced from O, but might not get marked because O has already been scanned.

These problems have significant implications for stack allocated objects, since the barriers needed to avoid them would not normally be present when performing a read from or write to an object.

The simplest solution to these problems is to simply disallow stack allocation of objects having fields that can contain collectable objects. Similarly, the first problem can be evaded by simply disallowing a stack allocated object to be referenced from some other stack. However, this latter solution may be an unacceptable solution in some languages or implementations.

An alternative solution is to allow stack allocation of such objects when the compiler can identify all accesses to the object and treat them specially, inserting the appropriate barriers. This is in fact a subset of the escape analysis performed by some implementations in order to perform compiler-directed stack allocation. However, this is a stronger limitation than might be imposed by such implementations, and this solution also requires such analysis, which might not already be present for other reasons in some language implementations, and might not be trivial to add.

When using a snapshot at the beginning write barrier, the first problem can be solved by ensuring that a stack allocated object has been scanned before deleting the object by unwinding the stack. However, this solution may introduce a large and difficult to predict mutator overhead when unwinding the stack.

The second problem can be solved by deferring the scanning of stack allocated objects until after the stacks themselves have been scanned; that is, exclude the space used for stack allocated objects from the containing call frames when performing the stack scan and instead scan stack allocated objects in an additional later phase.

Stage 3—Scan of Permanent Objects

In the preferred embodiment, the step of scanning the permanent objects 130 is performed in three sub-stages: scanning the sysquant area, scanning the permanent scanned cons cells and scanning the permanent scanned headered objects. Exemplary code for performing each of the three sub-stages is shown in Appendix A, from page 2, line 58 to page 5, line 26. These stages are known in the art and are included solely to illustrate the preferred embodiment of the present invention.

Stage 4—Scan Marked Objects

The processing performed by Stage 4—scan marked objects (step 140)—is also known in the art. Appendix A, from page 5, line 33 to page 6, line 55, includes exemplary code used in the preferred embodiment for scanning objects in the mark chain.

Stage 5—Flip the Collector

In the final stage—flipping the collector 150—the garbage collector reclaims all objects that were not reachable by returning them to free memory. This process is well-known in the art and is not discussed in detail herein. Appendix A, from page 12 to page 16 contains exemplary code for this stage.

It will be appreciated by those skilled in the art that the present invention may be practiced in connection with details that differ from the specific examples of implementation set forth herein, and can be implemented in devices, systems and methods differing from those shown. Thus, the details set forth herein are provided by way of illustration rather than limitation, and the invention is limited only by the scope of the appended claims. each of the three sub-stages is shown in Appendix A, from page 2, line 58 to page 5, line 26. These stages are known in the art and are included solely to illustrate the preferred embodiment of the present invention.

Stage 4—Scan Marked Objects

The processing performed by Stage 4—scan marked objects (step 140)—is also known in the art. Appendix A, from page 5, line 33 to page 6, line 55, includes exemplary code used in the preferred embodiment for scanning objects in the mark chain.

Stage 5—Flip the Collector

In the final stage—flipping the collector 150—the garbage collector reclaims all objects that were not reachable by returning them to free memory. This process is well-known in the art and is not discussed in detail herein. Appendix A, from page 12 to page 16 contains exemplary code for this stage.

It will be appreciated by those skilled in the art that the present invention may be practiced in connection with details that differ from the specific examples of implementation set forth herein, and can be implemented in devices, systems and methods differing from those shown. Thus, the details set forth herein are provided by way of illustration rather than limitation, and the invention is limited only by the scope of the appended claims.

```
;;; Treadmill-based garbage collector
;;;
;;;

(in-package "L-SYSTEM")
(no-multi-processing)

;;; Incremental step routines are called with a single argument, a request
;;; counter, which indicates the amount of work remaining to be done during
;;; the current incremental step. This argument must be non-negative.  If,
;;; during a step routine's processing, the request is fullfilled, the step
;;; routine simply returns, with no defined value expected.  If a step
;;; routine completes its processing then it should tailcall the next step
;;; routine, by tailcalling either gc-transition-step or gc-transition-pop.
;;; The latter functions ensure that the request residue is positive before
;;; actually invoking the next step routine.

;;;;;;;;;;;;;;;;;;;;;;;;;;;;;;;;;;;;;;;;;;;;;;;;;;;;;;;;;;;;;;;;;;;;;;;;;;;;
;;; Incremental step transitions
;;;
;;; The transition from one incremental step routine to the next is table
;;; driven, so that any individual step routine need not be aware of the
;;; routine(s) it can transition to.

;;; Stack of transition sequences.  A transition sequence is a circular
;;; list of transition specifications.  A transition specification is
;;; either a transition sequence or an incremental step function.  When
;;; transitioning to a new entry, if it is a step function then it is
;;; called, while if it is a transition sequence then it is pushed onto
;;; the stack and transitioning proceeds anew, processing the newly
;;; installed transition sequence.  A transition can also be specified
;;; as a pop operation, when the current sequence is popped off the
;;; stack and the previous sequence is made current, with transitioning
;;; proceeding from there.
(defvar *treadmill-transitions-stack* nil)

;;; Indication of current transition stack depth.
;;; Push increments, and pop decrements.
(defvar *treadmill-transitions-depth* nil)      ; nil indicates uninitialized (defun gc-transition-step (request)
  (decf request)                          ; decrement request for work performed here
  (let* ((depth *treadmill-transitions-depth*)
         (stack *treadmill-transitions-stack*)
         (entry (svref stack depth))
         (state (car entry)))
    (setf (svref stack depth) (cdr entry))      ; step to next transtion
    ;; dispatch on type of new state to determine how to handle it
    (cond ((consp state)
           ;; push current transition state onto stack and install new state as current
           (incf depth)
           (setf *treadmill-transitions-depth* depth)
           (setf (svref stack depth) state)
           (gc-transition-step request))        ; retry step with newly installed state
          (t                                    ; state is stepper function
           ;; record new stepper function as current stepper function,
           ;; and invoke it if request is not yet exhausted.
           (setf (%sqref (ltarget *lsq-gc-incremental-stepper*)) state)
           (when (plusp request) (%funcall state request))))))

(define-compiler-macro gc-transition-update-step ()
  `(gc-transition-step -1))                ; negative request prevents invocation of new step routine (defun gc-transition-pop (request)
  (decf *treadmill-transitions-depth*)          ; pop transitions stack
  (gc-transition-step request))                 ; transition to next step ;;; Define the transition sequences, and the collector's startup function
;;; (gc-treadmill-start), which initializes the transition state and then
;;; starts the transition process.
(macrolet
```

APPENDIX A

```
 1    ((define-transitions (&body transitions)
 2       (let (;; compute maximum stack depth for the transitions being used.
 3             (depth (labels ((compute-depth (depth transitions)
 4                               (if (symbolp transitions)
 5                                   depth
 6                                   (loop for subtran in transitions
 7                                         maximize (compute-depth (1+ depth) subtran))))))
 8                      (compute-depth 0 transitions))))
 9        `(defun gc-treadmill-start (request)
10           (when (null *treadmill-transitions-depth*)   ; detect recursion and do nothing if so
11             (setf *treadmill-transitions-depth* 0)     ; initialize and thereby block recursion
12             ;; initialize stack.  the allocations here will attempt to invoke the
13             ;; collector, hence the recursion detection and blocking above.
14             (with-static-consing
15               (setf *treadmill-transitions-stack* (make-array ,depth :initial-element nil))
16               ;; initialize the first transition stack entry with transition sequence.
17               (setf (svref *treadmill-transitions-stack* 0)
18                     ,(labels ((generate-transitions (transitions)
19                                 (if (symbolp transitions)
20                                     `(symbol-function ',transitions)
21                                     (let ((transition-list (gensym)))
22                                       `(let ((,transition-list (list ,@(mapcar #'generate-transitions
23 transitions))))
24                                          ;; make transition-list circular
25                                          (setf (cdr (last ,transition-list)) ,transition-list)
26                                          ,transition-list)))))
27                        (generate-transitions transitions))))
28             ;; start the collector by invoking the first transition entry.
29             (gc-transition-step request)))))

31   (define-transitions
32     gc-update-treadmill-allocations-start
33     gc-update-treadmill-allocations
34     (gc-scan-next-stack              ; transition-pop if all multi-stacks scanned
35      gc-scan-multi-stack
36      )
37     gc-scan-master-stack
38     gc-scan-stacks-complete
39     gc-scan-sysquant-start
40     gc-scan-sysquant
41     gc-scan-permanent-conses-start
42     gc-scan-permanent-conses
43     gc-scan-permanent-objects-start
44     gc-scan-permanent-objects
45     gc-scan-marked-start
46     gc-scan-marked
47     gc-verify-heap-scanned
48     gc-flip-treadmills
49     gc-flip-large-object-trailer-only-treadmills
50     gc-flip-table-treadmills-start
51     gc-flip-table-treadmills
52     gc-flip-full-treadmills-start
53     gc-flip-full-treadmills
54     gc-optimize-system-memory
55     gc-cycle-complete
56     ))

58   ;;;;;;;;;;;;;;;;;;;;;;;;;;;;;;;;;;;;;;;;;;;;;;;;;;;;;;;;;;;;;;;;;;;;;;;;;
59   ;;; incremental scan step routines for scanning the heap and sysquant.

61   (defun gc-scan-sysquant-start (request)
62     (setf (%sqref (ltarget *lsq-gc-incremental-scan-pointer*))
63           (%gc-memory-table-value :sysquant :lo (ltarget *lsq-gc-scan-start*)))
64     (setf (%sqref (ltarget *lsq-gc-incremental-scan-counter*))
65           (- (ltarget *lsq-gc-scan-end*) (ltarget *lsq-gc-scan-start*)))
66     (gc-transition-step (1- request)))

68   (defun gc-scan-sysquant (request)
69     (let ((counter (%sqref (ltarget *lsq-gc-incremental-scan-counter*)))
70           (pointer (%sqref (ltarget *lsq-gc-incremental-scan-pointer*))))
71       (cond ((< request counter)
```

APPENDIX A      2

```
;; request residue is less than the remaining block size.
;; scan only request residue entries, update remaining block size
;; and block starting position, and done with this step.
(setf (%sqref (ltarget *lsq-gc-incremental-scan-counter*)) (- counter request))
(setf (%sqref (ltarget *lsq-gc-incremental-scan-pointer*)) (+ pointer request))
(%l-scan-block pointer (+ pointer request)))
(t
 ;; scan remainder of sysquant block.
 (%l-scan-block pointer (+ pointer counter))
 ;; special handling for saved master cp, which may or may not be
 ;; in the normally scanned section of the sysquant area.
 (macrolet ((scan-saved-master-cp ()
               (if (<= (ltarget *lsq-gc-scan-start*)
                       (+ (ltarget *lsq-saved-master*) (ltarget *stack-saved-cp*))
                       (1- (ltarget *lsq-gc-scan-end*)))
                   '(progn)
                   '(progn
                      (decf request)
                      (%l-mark-possible-pointer
                        (%sqref (+ (ltarget *lsq-saved-master*) (ltarget *stack-saved-cp*)))
                        :scan)))))
   (scan-saved-master-cp))
 ;; continue step with next phase.
 (gc-transition-step (- request counter))))))

(defun gc-scan-permanent-conses-start (request)
  (setf (%sqref (ltarget *lsq-gc-incremental-scan-next*))
        (%sqref (ltarget *lsq-permanent-scanned-cons-chain*)))
  (gc-transition-step (1- request)))

(defun gc-scan-permanent-conses (request)
  (let ((pointer (%sqref (ltarget *lsq-gc-incremental-scan-next*))))
    (loop
      (cond ((zerop pointer)
             ;; reached end of permanent cons chain.
             ;; continue step with next phase.
             (return (gc-transition-step request)))
            ((<= request 0)
             ;; request is complete.  record next object to scan, for resumption
             ;; of phase on next step request, and done with this step.
             (setf (%sqref (ltarget *lsq-gc-incremental-scan-next*)) pointer)
             (return))                       ; request complete
            (t
             ;; scan the car and cdr fields of the cons, decrement request
             ;; counter, and step pointer to the next entry in the chain.
             (%l-increment-gc-statistic :scan-permanent-cons)
             (%l-mark-possible-pointer (%l-ref-mem pointer) :scan)
             (%l-mark-possible-pointer (%l-ref-mem (1+ pointer)) :scan)
             (decf request 2)
             (setf pointer (%l-ref-gc-info-chain pointer :permanent)))))))

(defun gc-scan-permanent-objects-start (request)
  (setf (%sqref (ltarget *lsq-gc-incremental-scan-next*))
        (%sqref (ltarget *lsq-permanent-scanned-object-chain*)))
  (setf (%sqref (ltarget *lsq-gc-incremental-scan-pointer*)) 0)
  (setf (%sqref (ltarget *lsq-gc-incremental-scan-counter*)) 0)
  (gc-transition-step (1- request)))

(define-compiler-macro header-type-dispatch (header &body clauses &environment env)
  ;; we assume header is a variable reference, so that there are no multiple
  ;; evaluation issues.  verify that assumption.
  (assert (eq header (lcomp-macroexpand header env)))
  ;; we assume that header types are in a contiguous block with the layout
  ;; described here, in order to optimize the dispatch on the header type
  ;;   min-header .. max-unscanned     unscanned object
  ;;   max-unscanned + 1 .. stack - 1  scanned object
  ;;   stack                           stack
  ;;   symbol [ max-header ]           symbol
  ;;   ...                             not headered object, i.e. cons
  (assert (= (ltarget *lptr-minimum-header*) (ltarget *lptr-minimum-unscanned-header*)))
  (assert (= (ltarget *lptr-symbol-header*) (ltarget *lptr-maximum-header*)))
```

APPENDIX A

```
(assert (= (ltarget *lptr-symbol-header*)
           (+ (ltarget *lptr-stack-header*)
              (ash 1 (tag-position (tag-category '*lptr-stack-header*))))))
(let ((unscanned  (assq :unscanned clauses))
      (scanned    (assq :scanned clauses))
      (stack      (assq :stack clauses))
      (symbol     (assq :symbol clauses))
      (non-header (assq :non-header clauses)))
  ;; unscanned and non-header clauses are optional, all others are required.
  ;; if an optional clause is not provided then it is assumed that the header
  ;; cannot indicate that kind of object, and so no code for checking for it
  ;; is needed in the expansion.
  (assert (and scanned stack symbol))
  (assert (every #'(lambda (clause)
                     (memq (first clause) '(:unscanned :scanned :stack :symbol :non-header)))
                 clauses))
  (let* ((type (gensym))
         (header-dispatch
          `(let ((,type (%l-imm-type ,header)))    ; get header type from header
             (cond ,@(when unscanned
                       `(((<= ,type (ltarget *lptr-maximum-unscanned-header*))
                          ,@(cdr unscanned))))
                   ((< ,type (ltarget *lptr-stack-header*)) ,@(cdr scanned))
                   ((= ,type (ltarget *lptr-symbol-header*)) ,@(cdr symbol))
                   ((= ,type (ltarget *lptr-stack-header*)) ,@(cdr stack))
                   (t (error "Unexpected scan-marked fall through for header ~X." ,type))))))
    (if (not non-header)
        header-dispatch
        `(if (not (%l-object-header-p ,header))
             (progn ,@(cdr non-header))
             ,header-dispatch))))

(defun gc-scan-permanent-objects (request)
  ;; ---
  ;; ---
  (let ((counter (%sqref (ltarget *lsq-gc-incremental-scan-counter*)))
        (pointer (%sqref (ltarget *lsq-gc-incremental-scan-pointer*))))
    (loop
      (cond ((< request counter)
             ;; request residue is less than the remaining block size.
             ;; scan only request residue entries, update remaining block size
             ;; and block starting position, and done with this step.
             (%l-increment-gc-statistic :scan-permanent-partial)
             (when (minusp request) (setf request 0))   ; normalize request
             (setf (%sqref (ltarget *lsq-gc-incremental-scan-counter*)) (- counter request))
             (setf (%sqref (ltarget *lsq-gc-incremental-scan-pointer*)) (+ pointer request))
             (return (%l-scan-block pointer (+ pointer request))))
            (t
             ;; scan remainder of current object, and decrement request correspondingly
             (%l-scan-block pointer (+ pointer counter))
             (decf request counter)
             ;; step to the next entry in the chain.
             (if (zerop (setf pointer (%sqref (ltarget *lsq-gc-incremental-scan-next*))))
                 ;; zero entry marks end of chain.
                 ;; continue step with next phase.
                 (return (gc-transition-step request))
                 (let ((header (%l-ref-mem pointer)))    ; get object's header
                   ;; get next chain entry from new current, and record it for later
                   (setf (%sqref (ltarget *lsq-gc-incremental-scan-next*))
                         (%l-ref-gc-info-chain pointer :permanent))
                   (decf request)            ; decrement for cost of dispatch
                   (header-type-dispatch header
                     (:symbol
                       ;; symbols don't have a length field in the header, instead
                       ;; having a constant size.  step the pointer past the header,
                       ;; set the counter to the size of a symbol exclusive of the
                       ;; skipped header, and loop for further processing.
                       (%l-increment-gc-statistic :scan-permanent-symbol)
                       (incf pointer)
                       (setf counter (1- (ltarget *lsymbol-size*))))
                     (:stack
```

APPENDIX A

```
                    ;; process only stack header, stack body is processed separately.
                    ;; set the pointer to the start of the scanned part of the stack
                    ;; header, set the counter to the size of the scanned part, and
                    ;; loop for further processing, except that we first process the
                    ;; saved cp entry if it is not within the bounds of the normally
                    ;; scanned part of the header.
                    (%l-increment-gc-statistic :scan-permanent-stack)
                    ;; +1 to exclude object header
                    (incf pointer (1+ *stack-header-gc-start*))
                    (setf counter (- *stack-header-gc-end* *stack-header-gc-start*))
                    (unless (<= *stack-header-gc-start*
                                (+ *stack-saved-state* (ltarget *stack-saved-cp*))
                                *stack-header-gc-end*)
                      (%l-mark-possible-pointer
                        (%l-ref-mem (+ pointer
                                       (- *stack-saved-state* *stack-header-gc-start*)
                                       (ltarget *stack-saved-cp*)))
                        :scan)
                      (decf request)))
                   (:scanned
                    ;; normal scanned headered object.  step the pointer past the header,
                    ;; set the counter to the total size of the object exclusive of the
                    ;; header, and loop for further processing.
                    (%l-increment-gc-statistic :scan-permanent-object)
                    (setf counter (%l-header-pointer-count header))
                    (incf pointer)))))))))

(defun gc-scan-marked-start (request)
  (setf (%sqref (ltarget *lsq-gc-incremental-scan-pointer*)) 0)
  (setf (%sqref (ltarget *lsq-gc-incremental-scan-counter*)) 0)
  (gc-transition-step (1- request)))

(defun gc-scan-marked (request)
  ;; ---
  ;; ---
  (let ((counter (%sqref (ltarget *lsq-gc-incremental-scan-counter*)))
        (pointer (%sqref (ltarget *lsq-gc-incremental-scan-pointer*))))
    (loop
      (cond ((< request counter)
             ;; request residue is less than the remaining block size.
             ;; scan only request residue entries, update remaining block size
             ;; and block starting position, and done with this step.
             (%l-increment-gc-statistic :scan-dynamic-partial)
             (when (minusp request) (setf request 0))    ; normalize request
             (setf (%sqref (ltarget *lsq-gc-incremental-scan-counter*)) (- counter request))
             (setf (%sqref (ltarget *lsq-gc-incremental-scan-pointer*)) (+ pointer request))
             (return (%l-scan-block pointer (+ pointer request))))
            (t
             ;; scan remainder of current object, and decrement request correspondingly
             (%l-scan-block pointer (+ pointer counter))
             (decf request counter)
             ;; step to the next entry in the chain.
             (if (zerop (setf pointer (%sqref (ltarget *lsq-gc-marked-chain*))))
                 ;; zero entry marks end of chain.
                 ;; continue step with next phase.
                 (return (gc-transition-step request))
                 (let ((header (%l-ref-mem pointer)))
                   ;; remove pointer from marked chain
                   (setf (%sqref (ltarget *lsq-gc-marked-chain*)) (%l-ref-gc-info-chain pointer :marked))
                   ;; add pointer to scanned chain for the treadmill containing the pointer
                   ;; decrement request for this expensive operation
                   (%l-add-to-treadmill-scanned-chain pointer)
                   (decf request 3)         ; decrement for cost of dispatch (1) & add to scan (2)
                   (header-type-dispatch header
                     (:non-header       ; i.e. cons
                      ;; non-header indicates a cons, which has two fields to be
                      ;; scanned, one at pointer and one at pointer+1.  so set
                      ;; counter to 2 and loop for further processing.
                      (%l-increment-gc-statistic :scan-dynamic-cons)
                      (setf counter 2))
                     (:symbol
```

APPENDIX A

```
;; symbols don't have a length field in the header, instead
;; having a constant size.  step the pointer past the header,
;; set the counter to the size of a symbol exclusive of the
;; skipped header, and loop for further processing.
(%l-increment-gc-statistic :scan-dynamic-symbol)
(incf pointer)
(setf counter (1- (ltarget *lsymbol-size*))))
(:stack
;; process only stack header, stack body is processed separately.
;; set the pointer to the start of the scanned part of the stack
;; header, set the counter to the size of the scanned part, and
;; loop for further processing, except that we first process the
;; saved cp entry if it is not within the bounds of the normally
;; scanned part of the header.
(%l-increment-gc-statistic :scan-dynamic-stack)
;; +1 to exclude object header
(incf pointer (1+ *stack-header-gc-start*))
(setf counter (- *stack-header-gc-end* *stack-header-gc-start*))
(unless (<= *stack-header-gc-start*
            (+ *stack-saved-state* (ltarget *stack-saved-cp*))
            *stack-header-gc-end*)
  (%l-mark-possible-pointer
    (%l-ref-mem (+ pointer
                   (- *stack-saved-state* *stack-header-gc-start*)
                   (ltarget *stack-saved-cp*)))
                :scan)
    (decf request)))
(:scanned
;; normal scanned headered object.  step the pointer past the header,
;; set the counter to the total size of the object exclusive of the
;; header, and loop for further processing.
(%l-increment-gc-statistic :scan-dynamic-scanned-object)
(setf counter (%l-header-pointer-count header))
(incf pointer))
(:unscanned
;; unscanned headered object.  set the counter to zero, which will
;; lead to an empty scan and then step to the next object.
;; this routine could be reorganized to avoid the unnecessary empty
;; scan, but doing seems to add more complexity to the code than is
;; really worthwhile for the small benefit gained by doing so.  it
;; would also likely eliminate any chance of increasing the code
;; sharing between this routine and gc-scan-permanent-objects.
(%l-increment-gc-statistic :scan-dynamic-unscanned-object)
;; note that it could be important to perform this decrement of the
;; request counter, else a long sequence of unscanned objects in the
;; mark chain could lead to looping through here for an indeterminate
;; amount of time.  the earlier decrement of request for the cost of
;; adding the object to the corresponding scanned chain eliminates
;; that problem.  it would not be unreasonable to decrement by the
;; size of the object, since we are effectively processing that much
;; allocated space.  by only decrementing by one, we're effectively
;; letting the scanning process make more progress than would be
;; accounted for by the number of bytes of allocated objects processed.
(decf request)
(setf counter 0)))))))))))   ; nothing to mark ;;;;;;;;;;;;;;;;;;;;;;;;;;;;;;;;;;;;;;;;;;;;;;;;;;;;;;;;;;;;;;;;;;;;;;;;
;;; Updating allocation states for all treadmills
;;;
;;; This phase must be completed before commencing stack scanning.
;;;
;;; For each treadmill, if its allocation state is unmarked, then exchange
;;; its scanned and unmarked sequences in its ring, and set its allocation
;;; state to scanned.
;;;
;;; The scan for treadmills might miss some, if they are allocated after the
;;; update phase is initiated.  However, because the global allocation state
;;; is set to scanned, any such newly allocated treadmills will be initialized
;;; to the appropriate updated state, so missing them here is not a problem.

(defun gc-update-treadmill-allocations-start (request)
```

APPENDIX A

```
;; while scanning stacks, allocate objects with marked status.
(setf (%sqref (ltarget *lsq-gc-allocation-marked*)) 1)
;; set global dynamic allocation to scanned
(setf (%sqref (ltarget *lsq-gc-allocation-state*))
      (%sqref (ltarget *lsq-gc-info-status-value-scanned*)))
;; initialize next page index to process to zero
;; start scan with first page following static space
(setf (%sqref (ltarget *lsq-gc-incremental-update-next*))
      (ceiling (- (%static-space-free-pointer) (%sqref (ltarget *lsq-gc-sysmem-base-page*)))
               (%sqref (ltarget *lsq-gc-sysmem-page-size*))))
(gc-transition-step (1- request)))

(defun gc-update-treadmill-allocations (request)
  ;; can't use do-all-treadmills here because we need to count all times through
  ;; the loop, not just those associated with an actual treadmill.
  (do* ((page-count (%sqref (ltarget *lsq-gc-sysmem-page-count*)))
        (page-size (%sqref (ltarget *lsq-gc-sysmem-page-size*)))
        (page-index (%sqref (ltarget *lsq-gc-incremental-update-next*)) (1+ page-index)))
       ((<= page-count page-index)
        ;; invoke next phase once all pages have been processed.
        (gc-transition-step request))
    (if (%l-valid-treadmill-page-allocation-table-entry-p page-index)
        ;; if current page index refers to the head of a treadmill, update its allocation state.
        (setf request (%l-update-treadmill-allocation (+ (%sqref (ltarget *lsq-gc-sysmem-base-page*))
                                                         (* page-index page-size))
                                                      request)))
    (setf request (1- request)))
  (when (<= request 0)
    (setf (%sqref (ltarget *lsq-gc-incremental-update-next*)) (1+ page-index))
    (return))))

;;;;;;;;;;;;;;;;;;;;;;;;;;;;;;;;;;;;;;;;;;;;;;;;;;;;;;;;;;;;;;;;;;;;;;;;;
;;; Driver for stack processing
;;;
;;;    gc-scan-next-stack
;;;
;;; algorithm is
;;;   loop until pending multi-stack list is empty
;;;      stack := first stack in pending multi-stack list
;;;      remove stack from pending multi-stack list
;;;      if stack is active
;;;         add stack to completed multi-stack list
;;;         scan stack at head of completed multi-stack list
;;;      end if
;;;   end loop
;;;   move completed multi-stack list to pending multi-stack list
;;;   set completed multi-stack list to nil
;;;   scan master stack
;;;
;;; The scan pointer for a stack being examined here is by definition
;;; at one end or the other of a call frame.  It is either:
;;;   - at the beginning of the first call frame, or
;;;   - at the end of some call frame (possibly the last)
;;;
;;; Stack scanning is performed by a helper routine which handles
;;; suspension and resumption when the request has been fulfilled.
;;;
;;; Invocation of the helper routine consists of
;;;   - set the global scan pointer to the stack's scan pointer
;;;   - set the global scan counter to zero
;;;   - set the global stepper to the helper routine
;;;   - tail to the helper routine
;;; The idea is that this sets things up for the stepper routine to scan
;;; the empty remainder of the frame containing the scan pointer.  The
;;; stepper routine then starts scanning the frame which follows the scan
;;; pointer, if there is one.

(defun gc-scan-next-stack (request)
  (let ((stack (%multi :stacks-scan-pending-list)))
    (macrolet ((initialize-scan (scan-pointer initial-scan-pointer)
                 `(progn
```

```
            ;; scan pushes scan pointer forward, where it may be
            ;; left at the end of the scan.  rather than make all
            ;; places that might need to reset it do so, instead
            ;; initialize it here at the beginning of the scan.
            (setf ,scan-pointer ,initial-scan-pointer)
            ;; initialize incremental scan state
            (setf (%sqref (ltarget *lsq-gc-incremental-scan-pointer*)) ,scan-pointer)
            (setf (%sqref (ltarget *lsq-gc-incremental-scan-counter*)) 0))))
    (cond ((<= request 0) nil)           ; done with step if request complete
          ((null stack)                  ; end of pending list
           ;; all multi-stacks processed, process master stack after moving
           ;; multi-stack list from complete to pending
           (setf (%multi :stacks-scan-pending-list) (%multi :stacks-scan-complete-list))
           (setf (%multi :stacks-scan-complete-list) nil)
           (initialize-scan (%multi :master-scan-pointer) (%multi :master-initial-scan-pointer))
           (%1-increment-gc-statistic :scan-master-stack-startup)
           (gc-transition-pop (1- request)))
          (t
           ;; remove stack from pending list
           (setf (%multi :stacks-scan-pending-list) (%stack-scan-list stack))
           (cond ((not (%stack-ownp stack))    ; stack no longer active?
                  (setf (%stack-scan-list stack) nil)
                  (%1-increment-gc-statistic :scan-multi-stack-skip)
                  ;; process next multi-stack, unless current request satisfied
                  ;; decrement and test of request counter here prevents a long sequence
                  ;; of allocated and then free'd multi-stacks from keeping us in this
                  ;; loop for an unpredictable amount of time.
                  (gc-scan-next-stack (1- request)))
                 (t
                  ;; process current multi-stack, after adding it to head of complete list
                  (setf (%stack-scan-list stack) (%multi :stacks-scan-complete-list))
                  (setf (%multi :stacks-scan-complete-list) stack)
                  (initialize-scan (%stack-scan-pointer stack) (%stack-initial-scan-pointer stack))
                  (%1-increment-gc-statistic :scan-multi-stack-startup)
                  (gc-transition-step (1- request))))))))

;;;;;;;;;;;;;;;;;;;;;;;;;;;;;;;;;;;;;;;;;;;;;;;;;;;;;;;;;;;;;;;;;;;;;;;;;;;
;;; gc-scan-stacks-complete (defun gc-scan-stacks-complete (request)
  ;; now that stacks have been scanned, no longer need to force allocations
  ;; to be marked, instead allocating scanned.
  (setf (%sqref (ltarget *lsq-gc-allocation-marked*)) 0)
  (gc-transition-step (1- request)))

;;;;;;;;;;;;;;;;;;;;;;;;;;;;;;;;;;;;;;;;;;;;;;;;;;;;;;;;;;;;;;;;;;;;;;;;;;;
;;; Stack processing ;;; Some compiler macro helpers for the stack processing routines.
;;;
;;; stack-direction-dispatch &body clauses
;;;   Clauses are keyed by either :up or :down, with the value being forms
;;;   to execute for the respective direction.
;;;
;;; stack-frame-location fp offset
;;;   Adjust fp by offset, accounting for stack growth direction.
;;;
;;; stack-frame-ref fp offset
;;;   Reference the location indicated by fp and offset.  SETFable.

(define-compiler-macro stack-direction-dispatch (&body clauses)
  `(progn
     ,@(cdr (or (assq (ltarget *stack-growth-direction*) clauses)
                (error "Stack direction ~S is not one of ~{~S~^, ~}."
                       (ltarget *stack-growth-direction*)
                       (mapcar #'car clauses))))))

(define-compiler-macro stack-frame-location (fp offset)
  `(stack-direction-dispatch
     (:down (- ,fp ,offset))
     (:up   (+ ,fp ,offset))))
```

```
(define-compiler-macro stack-frame-ref (fp offset)
  `(%l-ref-mem (stack-frame-location ,fp ,offset)))

(define-compiler-macro stack-frame-set (fp offset value)
  `(%l-set-mem (stack-frame-location ,fp ,offset) ,value))

;;; Stack scan routines
;;;
;;; Terminology
;;;   - current frame:  partially scanned frame containing the scan pointer
;;;   - next frame:     frame pushed immediately after the current frame.
;;;   - previous frame: frame pushed immediately before the current frame.
;;;
;;; On entry, the scan pointer is within the current frame, after the
;;; current frame's save area.  The recorded offset is added to the scan
;;; pointer to find the end of the current frame.  The continuation
;;; recorded in the current frame is correct, because it is used to return
;;; to the previous frame, which has been fully scanned.  The associated
;;; real continuation is recorded in a sysquant global.  The continuation
;;; recorded in the next frame is an unwind routine.

(macrolet
  ((define-stack-scan (name stack-type)
     `(defun ,name (request)
        (%l-increment-gc-statistic ,(fintern-keyword "SCAN-~A-STACK" stack-type))
        (let (,@(when (eq stack-type :multi) `((stack (%multi :stacks-scan-complete-list)))))
          (symbol-macrolet ,(ecase stack-type
                              (:master
                                `((scan-pointer (%multi :master-scan-pointer))
                                  (saved-fp (%multi :saved-master (ltarget *stack-saved-fp*)))
                                  (saved-pc (%multi :saved-master (ltarget *stack-saved-pc*)))
                                  (saved-sp (%multi :saved-master (ltarget *stack-saved-sp*)))))
                              (:multi
                                `((scan-pointer (%stack-scan-pointer stack))
                                  (saved-fp (%stack-saved-fp stack))
                                  (saved-pc (%stack-saved-pc stack))
                                  (saved-sp (%stack-saved-sp stack)))))
            (let ((pointer scan-pointer))
              (if (/= pointer (%sqref (ltarget *lsq-gc-incremental-scan-pointer*)))
                ;; if the stack's scan pointer has changed from that recorded for resumption,
                ;; then the frame that was being processed has been reactivated or the stack
                ;; has been deleted, so the scan of this stack that was in progress is now
                ;; complete.  transition to the next stage.
                (progn
                  (%l-increment-gc-statistic ,(fintern-keyword "SCAN-~A-STACK-ACTIVATED" stack-type))
                  (gc-transition-step (1- request)))
                ;; fp is bound to the current fp for the stack being processed.
                ;; if the stack being processed is the current stack, then use the
                ;; current fp.  otherwise, used the saved-fp for the stack.
                ;; offset is the delta from pointer to the end of the current frame.
                ;; end is the end of the current frame.
                (let* ((fp (if ,(ecase stack-type
                                  (:master `(null (%multi :current-hwprocess)))
                                  (:multi  `(eq stack (%multi :current-hwprocess))))
                             (%l-get-fp)
                             saved-fp))
                       (offset (%sqref (ltarget *lsq-gc-incremental-scan-counter*)))
                       (end (+ pointer offset)))
                  (loop
                    ;; adjust request by offset.
                    (cond ((minusp (stack-direction-dispatch
                                     (:down (incf request offset))
                                     (:up   (decf request offset))))
                           (%l-increment-gc-statistic ,(fintern-keyword "SCAN-~A-STACK-PARTIAL" stack-type))
                           ;; if adjusted request is negative, then only scan part of
                           ;; current frame, with the amount to scan determined by the
                           ;; pre-adjusted request value.  the scan returns the actual
                           ;; end of the processed region, which might be beyond the
                           ;; limited scan end computed from end and request.  they
```

```
                      ;; will differ if that limited scan end is within the bounds
                      ;; of an unscanned block.  in that case, using the limited
                      ;; scan end would be quite bad.
                      (setf pointer
                            (%l-scan-stack-block pointer
                                                 (stack-direction-dispatch
                                                   (:down (- end request))
                                                   (:up   (+ end request)))))
                      ;; record new offset and pointer for later resumption.
                      (setf (%sqref (ltarget *lsq-gc-incremental-scan-counter*)) (- end pointer))
                      (setf scan-pointer pointer)
                      (setf (%sqref (ltarget *lsq-gc-incremental-scan-pointer*)) pointer)
                      (return))
                     (t
                      ;; scan the remainder of the current frame.
                      (%l-scan-stack-block pointer end)
                      (cond ((stack-direction-dispatch
                               (:down (%far<= end fp))
                               (:up   (%far>= end fp)))
                             ;; current frame is last frame, so scan of this stack is complete.
                             ;; update scan pointer and transition to the next phase.  note that
                             ;; the stack being scanned cannot be the currently executing stack.
                             ;; this is because we can never have a partially scanned last frame
                             ;; on the current execution stack.
                             (%l-increment-gc-statistic ,(fintern-keyword "SCAN-~A-STACK-FINISH-LAST-FRAME" stack-type))

;; we're done scanning this stack for this collection cycle
                             ;; and the initialization of the stack scan for the next cycle
                             ;; will reset it to the initial scan pointer.  so don't waste
                             ;; any time modifying it here.
                             ;;
                             ;; restore the continuation for the current frame, which currently
                             ;; contains an unwind routine, from sysquant global where it was
                             ;; recorded.
                             (setf saved-pc (%sqref (ltarget *lsq-gc-incremental-saved-pc*)))
                             (return (gc-transition-step request)))
                            (t
                             (%l-increment-gc-statistic ,(fintern-keyword "SCAN-~A-STACK-FRAMES" stack-type))
                             ;; step into next frame and start scanning it.
                             ;; set scan pointer to the frame pointer for the next frame.
                             (setf pointer (stack-frame-location end (- (ltarget *lframe-bottom*))))

;; scan the new current frame's save area.
                             ;; only the return value and cp slots need to be scanned.
                             (%l-mark-possible-pointer
                               (stack-frame-ref pointer (ltarget *lframe-return*))
                               :scan)
                             (%l-mark-possible-pointer
                               (stack-frame-ref pointer (ltarget *lframe-old-cp*))
                               :scan)
                             ;; update the continuation from the current frame, which is
                             ;; currently an unwind routine, now that the previous frame
                             ;; has been completely scanned.  however, if the current
                             ;; frame is actually the initial dummy frame pushed on each
                             ;; stack (so that there is no previous frame), the current
                             ;; continuation value is actually the original continuation
                             ;; value rather than an unwind routine, and it should be left
                             ;; unmodified.
                             (unless (%l-stack-base-p (stack-frame-ref pointer (ltarget *lframe-old-fp*)))

;; restore the continuation to the previous frame from the
                               ;; sysquant global where it was recorded.
                               (stack-frame-set pointer
                                                (ltarget *lframe-return-pc*)
                                                (%sqref (ltarget *lsq-gc-incremental-saved-pc*))))
                             ;; adjust request for the scan of the save area and continuation
                             update.
                             (decf request 3)
                             (cond ((stack-direction-dispatch
                                      (:down (%far< fp pointer))
```

```
           (:up    (*far> fp pointer)))
     ;; current frame is not the last frame of stack.
     ;; get new offset from current frame's scan-info.
     ;; record continuation for reentry from next frame to
     ;; current frame, and replace next frame's continuation
     ;; with unwind routine.
     ;; set pointer to top of current frame's save area.
     ;; set end to bottom of next frame's save area.
     ;; loop to process body of current frame.
     (setf offset (stack-frame-ref pointer (ltarget *lframe-scan-
info*)))

(let ((next-pointer (+ pointer offset
                             (stack-direction-dispatch
                              (:down (- (ltarget *lframe-procall-
size*))

(:up    (ltarget *lframe-procall-
size*))))))

;; record continuation for reentry from next frame
       ;; to current frame in sysquant global.
       (setf (%sqref (ltarget *lsq-gc-incremental-saved-pc*))
             (stack-frame-ref next-pointer (ltarget *lframe-return-
pc*))

(stack-frame-set next-pointer
                         (ltarget *lframe-return-pc*)
                         (%sqref ,(syscall-index
                                    (fintern-keyword "UNWIND--A-STACK"
                                                    stack-type)))))
     (setf pointer (stack-frame-location pointer (ltarget *lframe-
top*)))

(setf end (+ pointer offset))
     (decf request))         ; decrement request for above work
    ((/= fp (%l-get-fp))
     ;; current frame is the last frame of some other stack.
     (%l-increment-gc-statistic
      ,(fintern-keyword "SCAN--A-STACK-LAST-FRAME-OTHER" stack-
type))

;; record continuation for reentry to current frame in
     ;; sysquant entry, and replace it in the stack's header
     ;; save area with unwind routine.
     ;; set pointer to top of current frame's save area.
     ;; set end to saved sp for current stack, which is the top
     ;; of the current frame.
     ;; set offset from new pointer and end values.
     ;; loop to process body of current frame.
     (setf (%sqref (ltarget *lsq-gc-incremental-saved-pc*)) saved-
pc)

(setf saved-pc (%sqref ,(syscall-index
                               (fintern-keyword "UNWIND--A-STACK"
                                               stack-type))))
     (setf pointer (stack-frame-location pointer (ltarget *lframe-
top*)))

(setf end saved-sp)
     (setf offset (- end pointer))
     (decf request))         ; decrement request for above work
    (t
     ;; current frame is the last frame of the current stack.
     (%l-increment-gc-statistic
      ,(fintern-keyword "SCAN--A-STACK-LAST-FRAME-CURRENT" stack-
type))

;; this case requires special handling.
     ;; we could scan the current frame, though guaranteeing from
     ;; L code that we weren't missing some values pushed on the
     ;; stack after we capture the current stack pointer might be,
     ;; well, difficult. however, we actually know there isn't
     ;; anything interesting to the garbage collector here, so
     ;; instead we don't bother scanning this frame at all, except
     ;; for the current cp (just in case we are incrementally
     ;; developing the garbage collector!).
     (%l-mark-possible-pointer (%l-get-cp) :scan)
     ;; don't need to modify the scan pointer in this case.
     ;; we're done scanning this stack for this collection cycle
```

APPENDIX A

```
                                    ;; and the initialization of the stack scan for the next
                                    ;; cycle will reset it to the initial scan pointer.  so
                                    ;; don't waste any time modifying it here.
                                    (return (gc-transition-step (1- request)))))
                              ;; ensure request is non-negative for next pass.
                              (when (minusp request) (setf request 0))
                              )))))))))))

(define-stack-scan gc-scan-multi-stack  :multi)
  (define-stack-scan gc-scan-master-stack :master)
  )

;;;;;;;;;;;;;;;;;;;;;;;;;;;;;;;;;;;;;;;;;;;;;;;;;;;;;;;;;;;;;;;;;;;;;;;;;;;;;;;
;;; Flip treadmills and free garbage objects
;;;
;;; Treadmills which have only a large object trailer object allocated from
;;; them are referred to as large-object-trailer-only (LOTO) treadmills.
;;;
;;; This stage needs to find each treadmill and process it.  There are
;;; several places where treadmill chains might be found:
;;;
;;;    - entries in the treadmill table
;;;    - the full treadmill list
;;;    - entries in the LOTO treadmill table
;;;
;;; Allocation can lead to the transfer of a treadmill between some of these
;;; places, and modify some places by adding new treadmills.  The process
;;; being performed on treadmills here is effectively an expensive nop if
;;; performed a second time during the same collection cycle, so as long as it
;;; doesn't happen too often and continued forward progress can be ensured,
;;; there is no harm in repeated encounters with a given treadmill as it and
;;; this process make their independent way through the various data
;;; structures.  However, this process must ensure that it visits the places
;;; where treadmills are found in the correct order.  If a treadmill can be
;;; moved by the allocator from a source place to some other destination
;;; place, then this process must visit the source place before visiting the
;;; destination place.  Visiting in the other order would allow such a moved
;;; treadmill to escape processing.  Treadmill migration paths and
;;; modification of the various lists:
;;;
;;;    - Allocation of a new LOTO treadmill adds the treadmill to the last
;;;      entry in the LOTO treadmill table, thereby adding treadmills between
;;;      collection steps.
;;;
;;;    - The allocator can remove a treadmill from the first entry in the LOTO
;;;      treadmill table, moving it to the head of an entry in the treadmill
;;;      table.
;;;
;;;    - The allocator can add a new treadmill to the head of an entry in the
;;;      treadmill table.
;;;
;;;    - The allocator can remove a treadmill from the head of an entry in the
;;;      treadmill table, moving it to the head of the full treadmill list.
;;;
;;; These lead to the order of visiting being (1) the LOTO treadmill table,
;;; (2) the treadmill table, and finally (3) the full treadmill list.

(defun gc-flip-treadmills (request)
  (%l-increment-gc-statistic :flip-treadmills)
  (setf (%sqref (ltarget *lsq-gc-incremental-flip-index*)) 0)       ; destination index
  (setf (%sqref (ltarget *lsq-gc-incremental-flip-previous*)) 0)    ; source index
  (setf (%sqref (ltarget *lsq-gc-incremental-flip-next*)) (%l-large-object-trailer-only-treadmills 0))
  (%l-set-large-object-trailer-only-treadmills 0 0)
  (gc-transition-step request))

(defun gc-flip-table-treadmills-start (request)
  (setf (%sqref (ltarget *lsq-gc-incremental-flip-previous*)) 0)
  (setf (%sqref (ltarget *lsq-gc-incremental-flip-next*)) 0)
  (setf (%sqref (ltarget *lsq-gc-incremental-flip-index*))
        (1- (%sqref (ltarget *lsq-treadmill-table-size*))))
  (gc-transition-step (1- request)))
```

```
(defun gc-flip-full-treadmills-start (request)
  (setf (%sqref (ltarget *lsq-gc-incremental-flip-next*)) (%sqref (ltarget *lsq-treadmill-full-list*)))
  (setf (%sqref (ltarget *lsq-treadmill-full-list*)) 0)
  (gc-transition-step (1- request)))

(define-compiler-macro gc-delete-treadmill (treadmill request &environment env)
  (assert (eq treadmill (lcomp-macroexpand treadmill env)))
  `(progn
     (%l-invalidate-treadmill-page-allocation-table-entry ,treadmill)
     (c-call :fixnum "gc_free_volatile_system_memory"
             (,treadmill :fixnum-address-representation)
             ((%l-treadmill-npages ,treadmill) :fixnum)
             (,request :fixnum))))

(defun gc-flip-large-object-trailer-only-treadmills (request)
  (let ((index (%sqref (ltarget *lsq-gc-incremental-flip-index*)))
        (treadmill (%sqref (ltarget *lsq-gc-incremental-flip-next*))))
    (loop
      ;; treadmill is the next treadmill to process, or zero, which indicates the
      ;; end of the current treadmill chain.
      ;; index indicates the LOTO treadmill table entry to which processed treadmills
      ;; from the chain currently being processed are to be added after they have
      ;; been processed.
      (if (not (zerop treadmill))
          ;; have a treadmill. if the large object trailer is unmarked and so garbage,
          ;; then the treadmill contains no live objects (since the only object in the
          ;; treadmill is by definition the large object trailer). in that case, delete
          ;; the treadmill. otherwise, flip the treadmill and add it to the destination
          ;; chain. finally, set treadmill to the next treadmill in the chain being
          ;; processed, and loop.
          (let ((next (%l-treadmill-next-treadmill treadmill)))
            (%l-increment-gc-statistic :flip-treadmills-LOTO)
            (if (%l-gc-info-status-p (%l-treadmill-large-object-trailer treadmill) :unmarked)
                (progn
                  (%l-increment-gc-statistic :flip-treadmills-delete-LOTO)
                  (setf request (gc-delete-treadmill treadmill request)))
                (progn
                  (%l-set-treadmill-next-treadmill treadmill (%l-large-object-trailer-only-treadmills index))
                  (%l-set-large-object-trailer-only-treadmills index treadmill)
                  (decf request)))
            (setf treadmill next))
          ;; reached the end of the current chain.
          (let ((next-index (1+ (%sqref (ltarget *lsq-gc-incremental-flip-previous*)))))
            (if (= next-index (ltarget *lsq-large-object-trailers-only-treadmills-size*))
                ;; current entry was the last entry, so done with this phase.
                ;; transition to next phase.
                (return (gc-transition-step request))
                ;; step to the next chain, and start processing it.
                (progn
                  ;; record new source index. compute and record new destination
                  ;; index, which refers to the entry preceeding the source entry.
                  ;; set treadmill to the head of the chain in the new source entry.
                  ;; clear the new source entry, and loop.
                  (setf (%sqref (ltarget *lsq-gc-incremental-flip-previous*)) next-index)
                  (setf index (1- next-index))
                  (setf (%sqref (ltarget *lsq-gc-incremental-flip-index*)) index)
                  (setf treadmill (%l-large-object-trailer-only-treadmills next-index))
                  (%l-set-large-object-trailer-only-treadmills next-index 0)
                  (decf request)))))
      (unless (plusp request)
        (setf (%sqref (ltarget *lsq-gc-incremental-flip-next*)) treadmill)
        (return)))))

;;; helper for gc-flip-table-treadmills and gc-flip-full-treadmills.
;;; treadmill and request are assumed to be lexical variables.
;;; returns updated request value.
(define-compiler-macro gc-flip-free-unmarked (treadmill request free-statistic &environment env)
  ;; check that arguments are variable references.
  (assert (eq treadmill (lcomp-macroexpand treadmill env)))
```

APPENDIX A

```
     (assert (eq request (lcomp-macroexpand request env)))
     (let ((trailer (gensym))
           (free (gensym))
           (npages (gensym)))
       `(let ((,trailer (%l-treadmill-large-object-trailer ,treadmill)))
          (when (and (not (zerop ,trailer)) (%l-gc-info-status-p ,trailer :unmarked))
            ;; large object trailer exists, but is now garbage.
            ;; release trailing pages of the treadmill which are fully occupied
            ;; by the large object trailer, returning them to the system memory
            ;; manager, and update the treadmill to allow allocation from the
            ;; end of its new last page, which may have been partially covered
            ;; by the trailer.
            (%l-increment-gc-statistic ,free-statistic)
            (let* ((,free (%l-treadmill-remove-large-object-trailer ,treadmill))
                   (,npages (%l-treadmill-reallocate-large-object-trailer-space ,treadmill ,free)))
              (decf ,request 4)          ; lots of work in remove / reallocate
              (unless (zerop ,npages)
                (setf ,request (c-call :fixnum "gc_free_volatile_system_memory"
                                       (,free :fixnum-address-representation)
                                       (,npages :fixnum)
                                       (,request :fixnum))))))
          ;; free unmarked objects in the treadmill, adding them to the
          ;; treadmill's free list.
          ;; top <-> { scanned(0..S) }* <-> { free(0..F) }* <-> bottom <-> { unmarked(0..U) }* <-> top
          ;; =>
          ;; top <-> { scanned(0..S) }* <-> { free(0..F) }* <-> { unmarked(0..U) }* <-> bottom <-> top
          ;;
          ;; if free != bottom
          ;;   remove bottom from treadmill
          ;;   insert bottom before top, don't care about allocation type for bottom
          ;; elseif next(bottom) != top
          ;;   free = next(bottom)
          ;;   remove bottom from treadmill
          ;;   insert bottom before top, don't care about allocation type for bottom
          ;; end
          (%l-treadmill-free-unmarked ,treadmill)
          (- ,request 4))))                  ; lots of work in free unmarked operation (defun gc-flip-full-treadmills (request)
  (let ((treadmill (%sqref (ltarget *lsq-gc-incremental-flip-next*))))
    (loop
      ;; treadmill is the next treadmill to process, or zero, which indicates
      ;; the end of the treadmill chain.
      (if (zerop treadmill)
          ;; when end reached, treadmill flipping is complete.
          ;; transition to next phase.
          (return (gc-transition-step request))
          (let ((next (%l-treadmill-next-treadmill treadmill)))
            (%l-increment-gc-statistic :flip-treadmills-full)
            ;; determine status of treadmill
            (if (%l-treadmill-scanned-chain-empty-p treadmill)
                ;; if scanned chain is empty, then this treadmill contains no
                ;; live objects and can be returned to the system memory manager.
                (progn
                  (%l-increment-gc-statistic :flip-treadmills-delete-full)
                  (setf request (gc-delete-treadmill treadmill request)))
                (progn
                  ;; free unmarked objects in the treadmill.
                  (setf request (gc-flip-free-unmarked treadmill request :flip-treadmills-full-free-lot))
                  ;; if the treadmill is full, add it to the full treadmill list.
                  ;; otherwise, add it to the appropriate element in the treadmill table.
                  (if (not (%l-treadmill-full-p treadmill))
                      (progn
                        (%l-increment-gc-statistic :flip-treadmills-full-not-full)
                        (%l-treadmill-insert-into-treadmill-table treadmill)
                        (decf request))
                      (progn
                        (%l-increment-gc-statistic :flip-treadmills-full-still-full)
                        (%l-set-treadmill-next-treadmill treadmill (%sqref (ltarget *lsq-treadmill-full-list*)))
                        (setf (%sqref (ltarget *lsq-treadmill-full-list*)) treadmill)))))))))
```

APPENDIX A

```
                    ;; step to next treadmill.
                    (if (plusp request)
                      (setf treadmill next)
                      (progn
                        (setf (%sqref (ltarget *lsq-gc-incremental-flip-next*)) next)
                        (return))))))))

(defun gc-flip-table-treadmills (request)
  (let* ((previous (%sqref (ltarget *lsq-gc-incremental-flip-previous*)))
         (treadmill (or (unless (zerop previous)
                          (let ((next (%sqref (ltarget *lsq-gc-incremental-flip-next*))))
                            (if (= next (%l-treadmill-next-treadmill previous))
                                ;; if previous->next == recorded next, use recorded
                                ;; next as next treadmill to process.
                                next
                                (progn
                                  (%l-increment-gc-statistic :flip-treadmills-restart-table-treadmills)
                                  nil))))
                        ;; if previous is zero then we're starting a new entry chain.
                        ;; if previous->next != recorded next then the allocator has
                        ;; moved previous to the full list.  the allocator might also
                        ;; have moved the recorded next treadmill (and possibly some
                        ;; number of followers) to the full list.  we can't tell that,
                        ;; but also don't care.  there are two cases.
                        ;;   - the allocator has not moved all of the treadmills that
                        ;;     followed previous to the full list.  in this case, all
                        ;;     of the treadmills currently present in the entry need
                        ;;     to be processed.
                        ;;   - the allocator has moved all of the treadmills that
                        ;;     followed previous to the full list.  in this case there
                        ;;     is at most one new treadmill in the chain, which either
                        ;;     has already been processed (via LOTO processing) or was
                        ;;     newly created in the proper state.
                        ;; in the first case, need to restart processing of the current
                        ;; entry.  in the second state, which we can't distinguish from
                        ;; the first, restarting the processing of the current entry is
                        ;; acceptable, since reprocessing such a treadmill is permitted,
                        ;; and just costs a little time (measured in request units).
                        ;; so in either case we restart the processing of current entry.
                        (%l-treadmill-table-entry (%sqref (ltarget *lsq-gc-incremental-flip-index*))))))
    (loop
      (if (zerop treadmill)
          ;; when end reached, step to next entry in the table, by decrementing index.
          (let ((new-index (1- (%sqref (ltarget *lsq-gc-incremental-flip-index*)))))
            (if (minusp new-index)
                ;; if end of table reached, transition to next phase.
                (return (gc-transition-step request))
                ;; initialize processing of current entry.
                ;; record current index, initialize previous to zero, initialize treadmill
                ;; to head of entry chain.
                (progn
                  (setf (%sqref (ltarget *lsq-gc-incremental-flip-index*)) new-index)
                  (setf previous 0)
                  (setf treadmill (%l-treadmill-table-entry new-index))
                  (decf request))))
          ;; process treadmill
          (let ((next (%l-treadmill-next-treadmill treadmill)))
            (%l-increment-gc-statistic :flip-treadmills-table)
            ;; determine status of treadmill.
            (if (%l-treadmill-scanned-chain-empty-p treadmill)
                ;; if scanned chain is empty, then this treadmill contains no
                ;; live objects, and can be returned to the system memory manager.
                (progn
                  (%l-increment-gc-statistic :flip-treadmills-delete-table-entry)
                  (setf request (gc-delete-treadmill treadmill request))
                  ;; splice treadmill out of chain.
                  (if (zerop previous)
                      ;; treadmill is at head of current entry, so update entry.
                      (progn
                        (%l-increment-gc-statistic :flip-treadmills-delete-table-head)
```

```
                    (%l-set-treadmill-table-entry (%sqref (ltarget *lsq-gc-incremental-flip-index*))
next))
                    ;; update previous->next to refer to next.
                    (%l-set-treadmill-next-treadmill previous next))
                  ;; step to next treadmill to process.
                  (setf treadmill next))
                (progn
                  ;; free unmarked objects in the treadmill
                  (setf request (gc-flip-free-unmarked treadmill request :flip-treadmills-table-free-lot))
                  ;; step to next treadmill to process.
                  (setf previous treadmill)
                  (setf treadmill next)))))
           (when (<= request 0)
             (setf (%sqref (ltarget *lsq-gc-incremental-flip-previous*)) previous)
             (setf (%sqref (ltarget *lsq-gc-incremental-flip-next*)) treadmill)
             (return)))))

;;;;;;;;;;;;;;;;;;;;;;;;;;;;;;;;;;;;;;;;;;;;;;;;;;;;;;;;;;;;;;;;;;;;;;;;;;;;
;;; End of collection cycle (defun gc-optimize-system-memory (request)
  (%l-increment-gc-statistic :optimize-system-memory)
  (when (plusp (setf request (c-call :fixnum "gc_optimize_volatile_system_memory" (request :fixnum))))
    (gc-transition-step request)))

;;; helper macro for dealing with deferred completion of a cycle.
;;; the current cycle must be in its final state.
(define-compiler-macro gc-finish-completed-cycle ()
  '(progn
     ;; note that by exchanging the unmarked and scanned status values,
     ;; this implicitly flips the allocation state from scanned to unmarked
     ;; (assuming, of course, that this is only used once the collection
     ;; has reached the point where the allocation state has been set to
     ;; scanned, which should be the case).
     (%l-flip-incremental-collection-state)
     (%l-update-gc-statistics)
     (%l-initialize-gc-statistics nil)
     (incf *gc-count*)))

;;; used to detect and terminate recursive collection cycles
(defvar *recursive-treadmill-cycle* nil)

(defun gc-cycle-complete (request)
  (when (zerop (%sqref (ltarget *lsq-gc-finish-cycle*)))
    (gc-finish-completed-cycle)
    ;; start a new collection cycle, but only if we're not already in
    ;; such a "new" cycle.  this can only occur when allocation is large,
    ;; so that request exceeds the amount needed to complete the initial
    ;; cycle and then perform a complete additional cycle.
    (if (not *recursive-treadmill-cycle*)
      (let ((*recursive-treadmill-cycle* t))
        (gc-transition-step (1- request)))
      (gc-transition-update-step))))

;;;;;;;;;;;;;;;;;;;;;;;;;;;;;;;;;;;;;;;;;;;;;;;;;;;;;;;;;;;;;;;;;;;;;;;;;;;;
;;; utility macros ;;; execute body within a context where the current cycle has finished
;;; and is being held in that state.  closely related to gc-treadmill (define-compiler-macro collection-completion-reason-code (reason)
  (let ((reason-map '((:collector . 1)
                      (:map-heap . 2)
                      (:room . 3)
                      (:dump-treadmills . 4)
                      )))
    (cdr (or (assq reason reason-map)
             (error "Unknown collection completion reason ~S." reason)))))

(define-compiler-macro with-completed-collection-cycle (reason &body body)
  (let ((old-reason (gensym))
```

```
          (complete-handler (gensym)))
     `(with-no-suspension
        (let ((,old-reason (%sqref (ltarget *lsq-gc-finish-cycle*))))
          (unwind-protect
           (let ((,complete-handler (symbol-function 'gc-cycle-complete)))
             (setf (%sqref (ltarget *lsq-gc-finish-cycle*)) (collection-completion-reason-code ,reason))
             (loop
                (%funcall (%sqref (ltarget *lsq-gc-incremental-stepper*)) most-positive-fixnum)
                (when (eq ,complete-handler (%sqref (ltarget *lsq-gc-incremental-stepper*))) (return)))
             ,@body)
           (setf (%sqref (ltarget *lsq-gc-finish-cycle*)) ,old-reason))))))

;;; execute body once for each treadmill
;;; closely related to gc-update-treadmill-allocations (define-compiler-macro do-all-treadmills ((treadmill &optional result) &body body)
  (let ((page-count (gensym))
        (page-size (gensym))
        (page-index (gensym)))
    `(do* ((,page-count (%sqref (ltarget *lsq-gc-sysmem-page-count*)))
           (,page-size (%sqref (ltarget *lsq-gc-sysmem-page-size*)))
           ;; start scan with first page following static space
           (,page-index (ceiling (- (%static-space-free-pointer) (%sqref (ltarget *lsq-gc-sysmem-base-page*)))
                                 ,page-size)
                        (1+ ,page-index)))
          ((<= ,page-count ,page-index) ,result)
       (when (%1-valid-treadmill-page-allocation-table-entry-p ,page-index)
         (let ((,treadmill (+ (%sqref (ltarget *lsq-gc-sysmem-base-page*)) (* ,page-index ,page-size))))
           ,@body)))))

;;;;;;;;;;;;;;;;;;;;;;;;;;;;;;;;;;;;;;;;;;;;;;;;;;;;;;;;;;;;;;;;;;;;;;;
;;; entry point for user request and gc-internal (defun gc-treadmill (gc-request-type)
  (unless (memq gc-request-type '(:normal :internal))
    (error "Unknown GC request type: ~S." gc-request-type))
  (with-no-suspension                  ; prevent suspension during incremental steps
    (when (zerop (%sqref (ltarget *lsq-gc-finish-cycle*)))
      ;; similar but not identical to with-completed-collection-cycle
      (unwind-protect
        (let ((complete-handler (symbol-function 'gc-cycle-complete)))
          (setf (%sqref (ltarget *lsq-gc-finish-cycle*)) (collection-completion-reason-code :collector))
          (macrolet ((finish-current-cycle ()
                       `(loop
                           (%funcall (%sqref (ltarget *lsq-gc-incremental-stepper*)) most-positive-fixnum)
                           (when (eq complete-handler (%sqref (ltarget *lsq-gc-incremental-stepper*)))
                             (gc-finish-completed-cycle)
                             (gc-transition-update-step)
                             (return)))))
            (finish-current-cycle)     ; finish currently in-progress cycle
            ;; perform another complete cycle when responding to user request
            (when (eq gc-request-type :normal)
              (finish-current-cycle))))
        (setf (%sqref (ltarget *lsq-gc-finish-cycle*)) 0)))))

;;;;;;;;;;;;;;;;;;;;;;;;;;;;;;;;;;;;;;;;;;;;;;;;;;;;;;;;;;;;;;;;;;;;;;;
;;; gc-internal handler for treadmill collector (defparameter *warn-if-non-incremental-garbage-collection* t)

(defun gc-internal-for-treadmill (allocation-space requested retry-count)
  (cond ((and (/= allocation-space (%gc-memory-table-space :user))
              (/= allocation-space (%gc-memory-table-space :static)))
         ;; gc will only free :user and :static space, so if allocation is not from
         ;; one of those then gc won't help, so just immediately report failure.
         (gc-internal-failure allocation-space requested))
        ((= (collection-completion-reason-code :map-heap) (%sqref (ltarget *lsq-gc-finish-cycle*)))
         ;; need to gc while in the middle of walking the heap.
         ;; abort the heap walk, returning nil to indicate that it was aborted.
```

```
        (throw 'map-dynamic-heap-objects-for-treadmill nil))
      ((< (ltarget *lsq-large-object-trailers-only-treadmills-size*) retry-count)
       ;; more attempts at collection for the same allocation won't help,
       ;; so just report failure.  the retry limit is derived from
       ;; *lsq-large-object-trailers-only-treadmills-size* because there
       ;; may be treadmills in that queue that could be used once they
       ;; trickle through and become allocatable, so won't be confident
       ;; that no progress is being made until all such could have made
       ;; it through.  the test is strictly greater than because we only
       ;; complete the current cycle, and on the first time through the
       ;; current cycle is already underway.
       ;;
       ;; we could instead add complexity to the interface between here and
       ;; the processing of that queue, by using a different finish-cycle
       ;; reason here which would be detected by the queue processing, but
       ;; that seems like more work than it is worth, since if we reach this
       ;; function at all we've already blown any real-time guarantees.
       (gc-internal-failure allocation-space requested))
      (t
       (when *warn-if-non-incremental-garbage-collection*
         (c-call () "printf" (#.(format nil "~%~%>>> forced non-incremental garbage collection~%")
:string)))
       (gc-treadmill :internal))))

;;;;;;;;;;;;;;;;;;;;;;;;;;;;;;;;;;;;;;;;;;;;;;;;;;;;;;;;;;;;;;;;;;;;
;;; support for heap walking
;;;
;;; These functions assume they are called within a with-no-suspension context.

(defun map-dynamic-heap-objects-for-treadmill (function)
  (catch 'map-dynamic-heap-objects-for-treadmill
    (with-completed-collection-cycle :map-heap
      (do-all-treadmills (treadmill t)        ; return t, indicating success
        (map-objects-in-treadmill function treadmill)))))

(defun map-objects-in-treadmill (function treadmill)
  (do ((base-address (%l-treadmill-scanned-chain treadmill)
                     (%l-treadmill-object-next base-address)))
      ((= base-address (%l-treadmill-free-pointer treadmill)))
    (%funcall function
              (let ((contents (%l-ref-mem base-address)))
                (cond ((not (%l-object-header-p contents))
                       (%l-construct-pointer base-address :cons))
                      ((= (%l-imm-type contents) (ltarget *lptr-symbol-header*))
                       (%l-construct-pointer base-address :symbol))
                      (t
                       (%l-construct-pointer base-address :object)))))))

;;;;;;;;;;;;;;;;;;;;;;;;;;;;;;;;;;;;;;;;;;;;;;;;;;;;;;;;;;;;;;;;;;;;
;;; entry point for room (defun room-for-treadmill (info)
  (when info
    (with-completed-collection-cycle :room
      (show-room-spaces)
      (terpri)
      (show-treadmill-usage)
      (terpri)
      (unless (eq info :default)
        (when (show-gc-statistics) (terpri))
        (dump-treadmills :count-objects t)
        (terpri))
      (gc-show-system-memory)
      (terpri)))
  (show-room-uptime))

(defvar *treadmill-live-counters* nil)
(defvar *treadmill-free-counters* nil)
(defvar *treadmill-size-map* nil)        ; map from treadmill table index to allocation size (defun show-treadmill-usage ()
```

```
(multiple-value-bind (live-counters free-counters size-map)
                    (if *treadmill-live-counters*
                        (values *treadmill-live-counters*
                                *treadmill-free-counters*
                                *treadmill-size-map*)
                        (macrolet ((make-counters ()
                                      `(make-array (ltarget *lsq-treadmill-table-size*)
                                                   :initial-element 0)))
                          (values (setf *treadmill-live-counters* (make-counters))
                                  (setf *treadmill-free-counters* (make-counters))
                                  (setf *treadmill-size-map* (make-counters))))))
  (macrolet ((clear-vector (counters)
               `(dotimes (i (ltarget *lsq-treadmill-table-size*))
                  (setf (svref ,counters i) 0))))
    (clear-vector live-counters)
    (clear-vector free-counters)
    (clear-vector size-map))
  (do-all-treadmills (treadmill)
    (let ((table-index (%l-treadmill-table-index treadmill)))
      (setf (svref size-map table-index) (%l-treadmill-allocation-size treadmill))
      (incf (svref live-counters table-index) (treadmill-live-count treadmill))
      (incf (svref free-counters table-index) (treadmill-free-count treadmill))
      (incf (svref free-counters table-index) (%l-treadmill-allocation-count treadmill))))
  (let ((total-live 0)
        (total-free 0)
        (total-size 0))
    (format t "~&Treadmill object usage:")
    (format t "~%    size       live     free     total    bytes")
    (dotimes (i (ltarget *lsq-treadmill-table-size*))
      (unless (zerop (svref size-map i))        ; zero indicates no treadmills at this index
        (let* ((size (svref size-map i))
               (live (svref live-counters i))
               (free (svref free-counters i))
               (live-size (* size live)))
          (incf total-live live)
          (incf total-free free)
          (incf total-size live-size)
          (format t "~%  ~6D  ~8D ~8D ~8D  ~8D"
                  size live free (+ live free)
                  (%object-units-to-bytes live-size)))))
    (format t "~%  ------  -------- -------- --------  --------")
    (format t "~%  total   ~8D ~8D ~8D  ~8D~%"
            total-live total-free (+ total-live total-free)
            (%object-units-to-bytes total-size)))))

(defun show-room-spaces ()
  (format t "~&~18T    Start~30T    End~42T    Size")
  ;; %gc-memory-table-value requires literal space.
  (macrolet ((show-space-info (space)
               `(show-room-space ,(substitute #\Space #\- (string-capitalize space))
                                 (%gc-memory-table-value ,space :lo)
                                 (%gc-memory-table-value ,space :bound)
                                 (%gc-memory-table-value ,space :size)))
             (show-spaces (&rest spaces)
               `(progn
                  ,@(loop for space in spaces
                          collect `(show-space-info ,space)))))
    (show-spaces :purecode :pure :sysquant :initial-static)
    (let* ((static-start (%gc-memory-table-value :static :lo))
           (static-end   (%static-space-free-pointer))
           (dynamic-start (let ((page-size (%sqref (ltarget *lsq-gc-sysmem-page-size*))))
                            (* page-size (ceiling static-end page-size))))
           (dynamic-end  (%gc-memory-table-value :lmem :bound)))
      (show-room-space "Static" static-start static-end (- static-end static-start))
      (show-room-space "Dynamic" dynamic-start dynamic-end (- dynamic-end dynamic-start))
      (terpri))))

(defun show-room-space (name start end size)
  (format t "~%~A:~18T#x~4,'0X~4,'0X~30T#x~4,'0X~4,'0X~42T~8D"
          name
          (%%upperhalf start)
```

```
            (%%lowerhalf start)
            (%%upperhalf end)
            (%%lowerhalf end)
            size))

;;;;;;;;;;;;;;;;;;;;;;;;;;;;;;;;;;;;;;;;;;;;;;;;;;;;;;;;;;;;;;;;;;;;;;;;;;;;
;;;
;;; utilities (defun dump-treadmill (treadmill count-objects)
  (format t "~%~4X~4,'0X: ~6D ~A  ~8D  ~8D"
          ;; ---
          ;; ---
          ;; ---
          (%%upperhalf treadmill)
          (%%lowerhalf treadmill)
          ;; number of pages
          (%l-treadmill-npages treadmill)
          ;; does it have a large object trailer?
          (if (zerop (%l-treadmill-large-object-trailer treadmill))
              "  "
              " * ")
          ;; allocation size
          (%l-treadmill-allocation-size treadmill)
          ;; number of unallocated objects available
          (%l-treadmill-allocation-count treadmill))
  (when count-objects
    (format t "  ~8D  ~8D"
            (treadmill-live-count treadmill)
            (treadmill-free-count treadmill))))

(defun dump-treadmills-internal (count-objects)
  (do-all-treadmills (treadmill (terpri))
    (dump-treadmill treadmill count-objects)))

(defun dump-treadmills (&key count-objects)
  (with-no-suspension
    (format t "~&Treadmill dump:")
    (format t "~% address  npages lot      size    unalloc")
    (if count-objects
        (with-completed-collection-cycle :dump-treadmills
          (format t "     live     free")
          (dump-treadmills-internal t))
        (dump-treadmills-internal nil))))

(defun treadmill-live-count (treadmill)
  (do ((entry (%l-treadmill-scanned-chain treadmill) (%l-treadmill-object-next entry))
       (end (%l-treadmill-free-pointer treadmill))
       (count 0 (1+ count)))
      ((= entry end) count)))

(defun treadmill-free-count (treadmill)
  (do ((entry (%l-treadmill-free-pointer treadmill) (%l-treadmill-object-next entry))
       (end (+ treadmill (%addressing-units-to-object-units (ltarget *pseqd-bottom*))))
       (count 0 (1+ count)))
      ((= entry end) count)))

;;; verify all live objects scanned, for debugging
;;;
;;; all of these routines are careful to not perform tail-calls
;;; to sub-functions, in order to provide more context if an
;;; error is detected.

(defvar *verify-heap-scanned* nil)

(defun gc-verify-heap-scanned (request)
  (when *verify-heap-scanned*
    (verify-heap-scanned))
  (gc-transition-step (1- request)))

(defun verify-heap-scanned ()
```

```
;; verify dynamic objects in treadmills
(do-all-treadmills (treadmill)
  (verify-treadmill-contents-scanned treadmill))
(verify-permanent-conses-scanned)
(verify-permanent-objects-scanned)
(verify-sysquant-scanned)
(verify-master-stack-scanned)
nil)

(defun verify-treadmill-contents-scanned (treadmill)
  (do ((entry (%l-treadmill-scanned-chain treadmill) (%l-treadmill-object-next entry))
       (end (%l-treadmill-free-pointer treadmill)))
      ((= entry end) nil)
    ;; allow permanent, so that we can use :permanent to detect new
    ;; allocations.  besides, status-p test doesn't support :scanned.
    (unless (%l-gc-info-status-p entry :scanned+permanent)
      (breakpoint)
      (error "Object in scanned chain of #x~X not scanned: #x~X."
             treadmill entry))
    (verify-object-contents-scanned entry))
  (let ((trailer (%l-treadmill-large-object-trailer treadmill)))
    (unless (zerop trailer)
      ;; allow permanent, so that we can use :permanent to detect new
      ;; allocations.  besides, status-p test doesn't support :scanned.
      (when (%l-gc-info-status-p trailer :scanned+permanent)
        (verify-object-contents-scanned trailer))))
  nil)

(defun verify-permanent-conses-scanned ()
  (do ((base (%sqref (ltarget *lsq-permanent-scanned-cons-chain*))
             (%l-ref-gc-info-chain base :permanent)))
      ((zerop base) nil)
    (verify-block-scanned base base 2)))

(defun verify-permanent-objects-scanned ()
  (do ((base (%sqref (ltarget *lsq-permanent-scanned-object-chain*))
             (%l-ref-gc-info-chain base :permanent)))
      ((zerop base) nil)
    (verify-object-contents-scanned base)))

(defun verify-sysquant-scanned ()
  (verify-block-scanned (%gc-memory-table-value :sysquant :lo)
                        (%gc-memory-table-value :sysquant :lo (ltarget *lsq-gc-scan-start*))
                        (- (ltarget *lsq-gc-scan-end*) (ltarget *lsq-gc-scan-start*)))
  nil)

(defun verify-master-stack-scanned ()
  (macrolet ((master-stack-bottom ()
               `(%sqref (ltarget *lsq-called-stackheight*)))
             (master-stack-top ()
               `(if (%multi :current-hwprocess)
                    ;; pick up saved sp
                    (%multi :saved-master (ltarget *stack-saved-sp*))
                    (%l-get-fp)))
             (verify-master-stack ()
               (ecase (ltarget *stack-growth-direction*)
                 ((:down)
                  `(verify-range-scanned (master-stack-bottom)
                                         (master-stack-top)
                                         (master-stack-bottom)))
                 ((:up)
                  `(verify-range-scanned (master-stack-bottom)
                                         (master-stack-bottom)
                                         (master-stack-top))))))
    (verify-master-stack)
    nil))

(defun verify-object-contents-scanned (base)
  (let ((header (%l-ref-mem base)))
    (header-type-dispatch header
      (:non-header (verify-cons-scanned base))
```

```
          (:symbol     (verify-symbol-scanned base))
          (:scanned    (verify-object-scanned base header))
          (:unscanned  nil)
          (:stack      (verify-stack-scanned base header))
          )))

(defun verify-cons-scanned (base)
  (verify-block-scanned base base 2)
  nil)

(defun verify-symbol-scanned (base)
  (verify-block-scanned base (1+ base) (1- (ltarget *lsymbol-size*)))
  nil)

(defun verify-object-scanned (base header)
  (verify-block-scanned base
                        (1+ base)
                        (%l-header-pointer-count header))
  nil)

(defun verify-stack-scanned (base header)
  (unless (<= *stack-header-gc-start*
              (+ *stack-saved-state* (ltarget *stack-saved-cp*))
              *stack-header-gc-end*)
    (verify-possible-pointer-scanned (%l-ref-mem (+ base
                                                   (- *stack-saved-state*
                                                      *stack-header-gc-start*)
                                                   (ltarget *stack-saved-cp*)))
                                     base))
  ;; verify stack header
  (verify-block-scanned base
                        ;; +1 to exclude object header
                        (+ base *stack-header-gc-start* 1)
                        (- *stack-header-gc-end* *stack-header-gc-start*))

;; verify stack body, when present
  (when (%l-ref-mem (+ base 1 *stack-ownp*))
    (macrolet ((stack-pointer-for-verify ()
                 `(if (= base (%l-addressify-pointer (%multi :current-hwprocess)))
                      (%l-get-fp)
                      (%l-ref-mem (stack-header-saved-pointer (ltarget *stack-saved-sp*)))))
               (stack-header-pointer (offset)
                 `(+ base (1+ ,offset)))
               (stack-header-saved-pointer (offset)
                 `(stack-header-pointer (+ *stack-saved-state* ,offset)))
               (scan-stack-body ()
                 ;; Do different things depending on the direction of stack growth.
                 (ecase (ltarget *stack-growth-direction*)
                   ((:down)
                    `(verify-range-scanned base
                                           (stack-pointer-for-verify)
                                           (+ base (%l-object-pointer-count (%l-ref-mem base)))))
                   ((:up)
                    `(verify-range-scanned base
                                           (stack-header-pointer *stack-header-size*)
                                           (stack-pointer-for-verify))))))
      (scan-stack-body)))
  nil)

(defun verify-block-scanned (container-base pointer count)
  (verify-range-scanned container-base pointer (+ pointer count)))

(defun verify-range-scanned (container-base start end)
  (do ((pointer start (1+ pointer)))
      ((<= end pointer) nil)
    (verify-possible-pointer-scanned (%l-ref-mem pointer) container-base)))

(defun verify-possible-pointer-scanned (object container-base)
  (when (%l-dynamic-pointer-p object)
    (unless (%l-gc-info-status-p (%l-addressify-pointer object) :scanned+permanent)
      (breakpoint)
```

APPENDIX A

```
1       (error "Container #x~X contains dead pointer to ~S (#x~X)."
2              container-base
3              object (%l-addressify-pointer object))))
4  nil)
```

APPENDIX A

I claim:

1. A method of automatic memory management, comprising the steps of (a) executing a stack scan phase by scanning each of a plurality of memory stacks, (b) replacing, when starting the scan of a call frame, the continuation for reactivating that frame with an unwind routine which will, if necessary, complete the scan of the call frame and only then reactivate the frame, and (c) performing the scan incrementally.

2. The method of claim 1 wherein the scanning of each of a plurality of memory stacks is in push order.

3. The method of claim 2 wherein once a stack has been completely scanned, by having a stack scanner reach the top of the stack, determining whether or not the stack needs to be rescanned during the current collection cycles.

4. The method of claim 2 wherein once a stack has been completely scanned, by the reactivation of a partially scanned frame causing the scan to be completed, determining whether or not the stack needs to be rescanned during the current collection cycles.

5. The method of claim 3, wherein the determining step comprises the step of (a) monitoring a mutator, and (b) if the mutator is using a "snapshot at the beginning" write barrier and stack scanning is performed as the first step of the scan phase of the collector, no rescanning is performed for the stack.

* * * * *